US010584975B2

(12) United States Patent
Fujimura et al.

(10) Patent No.: US 10,584,975 B2
(45) Date of Patent: Mar. 10, 2020

(54) INFORMATION PROCESSING APPARATUS AND INFORMATION PROCESSING METHOD

(71) Applicant: Panasonic Intellectual Property Corporation of America, Torrance, CA (US)

(72) Inventors: Ryota Fujimura, Kanagawa (JP); Yasunori Ishii, Osaka (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 27 days.

(21) Appl. No.: 15/962,601

(22) Filed: Apr. 25, 2018

(65) Prior Publication Data

US 2018/0347997 A1 Dec. 6, 2018

(30) Foreign Application Priority Data

May 31, 2017 (JP) .................................. 2017-107438
Jan. 11, 2018 (JP) .................................. 2018-002409

(51) Int. Cl.
*G01C 21/34* (2006.01)
*B60W 30/182* (2020.01)
(Continued)

(52) U.S. Cl.
CPC ...... *G01C 21/3469* (2013.01); *B60L 15/2045* (2013.01); *B60L 58/12* (2019.02);
(Continued)

(58) Field of Classification Search
CPC .. B60L 58/12; B60L 15/2045; B60L 2260/32; B60L 2260/52; G01C 21/3469;
(Continued)

(56) References Cited

U.S. PATENT DOCUMENTS 9,592,744 B2 * 3/2017 Zhao ................... B60L 11/1822
2004/0068366 A1 4/2004 Nisiyama
(Continued)

FOREIGN PATENT DOCUMENTS

JP 2004-125726 4/2004
JP 2014-134456 A 7/2014
(Continued)

OTHER PUBLICATIONS

The Extended European Search Report dated Oct. 29, 2018 for the related European Patent Application No. 18174602.5.

*Primary Examiner* — Atul Trivedi
(74) *Attorney, Agent, or Firm* — Greenblum & Bernstein, P.L.C.

(57) ABSTRACT

An information processing apparatus processes information regarding autonomous driving, considering the state of a battery in a vehicle. The information processing apparatus obtains power consumption information indicating an amount of power consumption of a module used in autonomous driving of the vehicle using unit-power consumption information of the module and destination information indicating a place to which the vehicle is to travel. Then, the information processing apparatus obtains output information using the power consumption information and outputs the output information.

15 Claims, 9 Drawing Sheets

(51) Int. Cl.
  *B60L 15/20* (2006.01)
  *G01C 21/36* (2006.01)
  *B60L 58/12* (2019.01)

(52) U.S. Cl.
  CPC ....... *B60W 30/182* (2013.01); *G01C 21/3697* (2013.01); *B60L 2260/32* (2013.01); *B60L 2260/52* (2013.01); *B60W 2510/085* (2013.01)

(58) Field of Classification Search
  CPC ........ G01C 21/3697; B60W 2510/085; B60W 30/182
  USPC .......................................................... 701/123
  See application file for complete search history.

(56) References Cited

U.S. PATENT DOCUMENTS

| | | | |
|---|---|---|---|
| 2015/0224845 A1* | 8/2015 | Anderson | B60G 17/019 |
| | | | 701/37 |
| 2016/0200421 A1* | 7/2016 | Morrison | G05D 1/0077 |
| | | | 244/17.23 |
| 2016/0236582 A1 | 8/2016 | Wang | |
| 2016/0311423 A1 | 10/2016 | Storm | |
| 2016/0311526 A1* | 10/2016 | Geise | B64C 27/08 |
| 2017/0120761 A1* | 5/2017 | Kapadia | B60L 11/184 |
| 2017/0123421 A1 | 5/2017 | Kentley et al. | |
| 2017/0151884 A1* | 6/2017 | Khosravi | B60K 6/48 |
| 2017/0174092 A1* | 6/2017 | Kohnke | G05D 1/0295 |
| 2017/0176195 A1* | 6/2017 | Rajagopalan | G01C 21/3415 |
| 2018/0173219 A1* | 6/2018 | Lee | B60W 50/082 |
| 2018/0283887 A1* | 10/2018 | Dudar | G01C 21/3469 |
| 2019/0009756 A1* | 1/2019 | Jacobs | B60S 5/06 |
| 2019/0031038 A1* | 1/2019 | Pursifull | B60L 58/12 |
| 2019/0135133 A1* | 5/2019 | Miller | B60L 53/34 |
| 2019/0263271 A1* | 8/2019 | Ashby | G06Q 10/06316 |
| 2019/0294173 A1* | 9/2019 | Szubbocsev | G05D 1/0274 |
| 2019/0324444 A1* | 10/2019 | Cella | G05B 19/12 |

FOREIGN PATENT DOCUMENTS

| | | |
|---|---|---|
| JP | 2015-017944 | 1/2015 |
| WO | 2015/124983 A1 | 8/2015 |

* cited by examiner

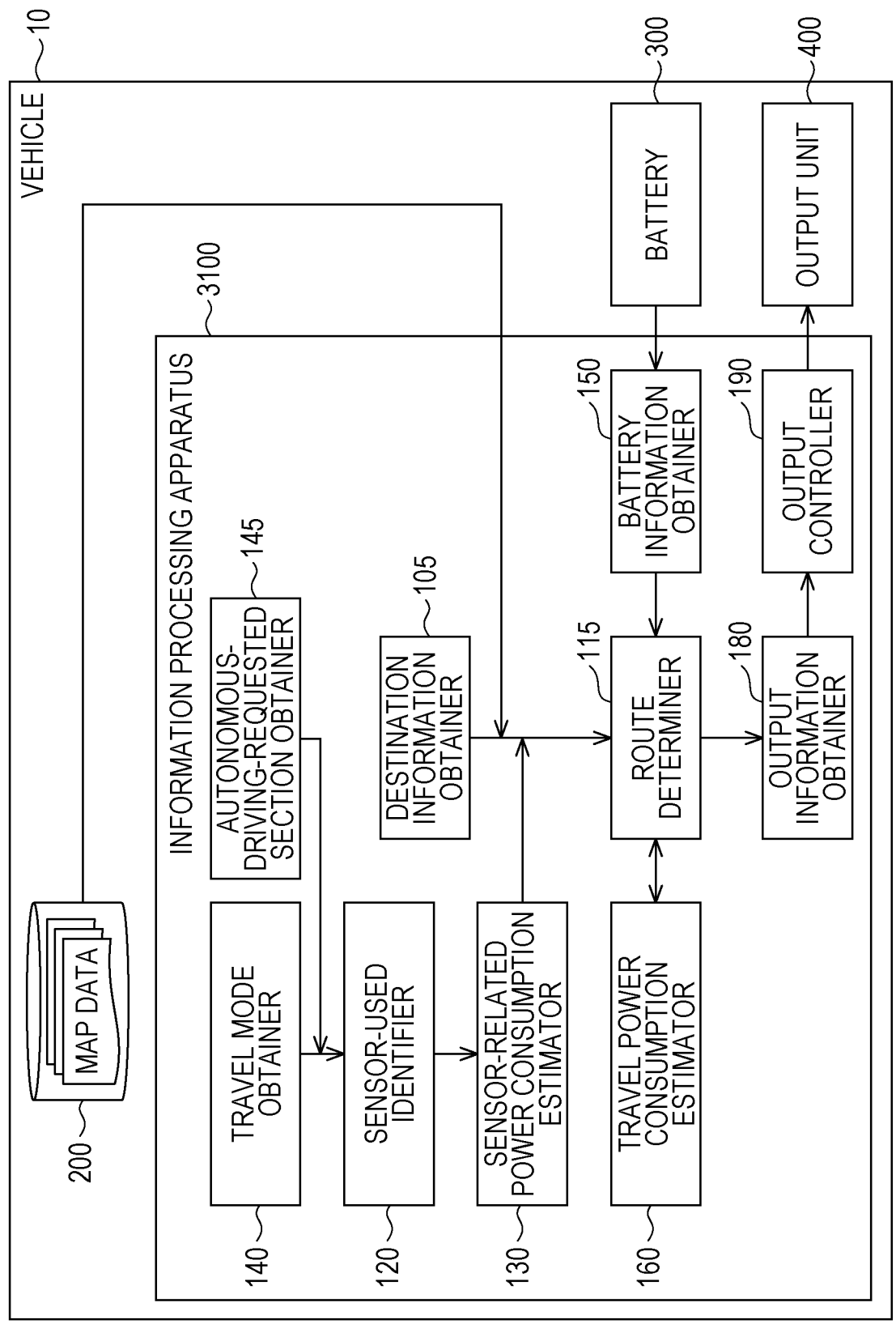

INFORMATION PROCESSING APPARATUS AND INFORMATION PROCESSING METHOD

BACKGROUND

1. Technical Field

The present disclosure relates to an information processing apparatus and an information processing method that can perform information processing for autonomous driving of a vehicle.

2. Description of the Related Art

Amid progress in actual implementation of autonomous vehicles having higher automation levels, a technology for presenting, to a driver, a section that is included in a navigation route and on which autonomous driving is to be performed, an estimated time that is required to travel on the section, or both thereof has been proposed (see Japanese Unexamined Patent Application Publication No. 2015-17944).

Also, in an automobile that can perform autonomous traveling (also referred to as hereinafter as "autonomous driving"), a technology has been proposed in which when a user gives an instruction for giving priority to autonomous traveling, a route is searched for so that a road along which a vehicle can perform autonomous traveling is selected with high priority and is presented to the user (see Japanese Patent No. 3928537).

SUMMARY

However, since information to be presented to the user is information obtained without considering the state of a battery of a vehicle, there are cases in which the autonomous traveling cannot be performed in practice.

One non-limiting and exemplary embodiment provides an information processing apparatus and so on for processing information regarding autonomous driving, considering a battery of a vehicle.

In one general aspect, the techniques disclosed here feature an information processing apparatus including: a processor; and a memory storing thereon a computer program. When executed by the processor, the computer program causes the processor to perform operations including: obtaining power consumption information indicating an amount of power consumed by a module used in autonomous driving of a vehicle and according to unit-power consumption information of the module and destination information indicating a place to which the vehicle is to travel; obtaining output information based on the power consumption information; and outputting the output information.

An information processing apparatus and an information processing method in the present disclosure can process information regarding autonomous driving, considering a battery of a vehicle.

It should be noted that general or specific embodiments may be implemented as a system, a method, an integrated circuit, a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a block diagram illustrating one example of the functional configuration of an information processing apparatus in a fourth embodiment;

DETAILED DESCRIPTION (Findings Underlying Present Disclosure)

Figure 1:
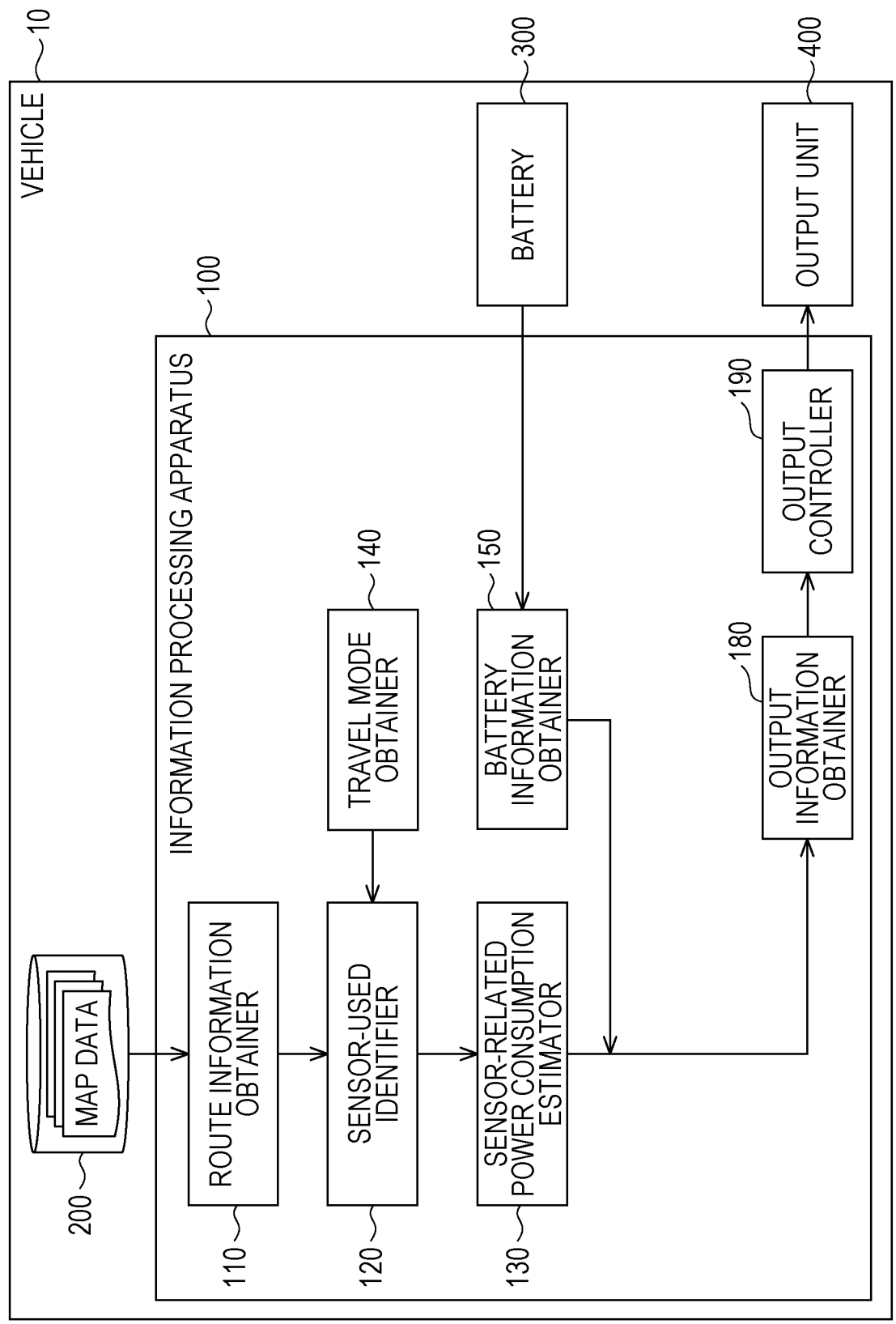
FIG. 1 is a block diagram illustrating one example of the functional configuration of an information processing apparatus in a first embodiment.

The present inventor has found the following problems with the above-described technology for assisting autonomous driving.

In autonomous driving that is approaching practical use in recent years, various sensors are used. Data obtained by the sensors is subjected to processing for recognizing the situation of a vehicle or the surroundings thereof and processing for making a decision according to the situation, the processing being executed by an in-vehicle processor. Such use of the sensors in autonomous driving and the processing performed by the processor consume power accumulated in a battery included in the vehicle. The amount of power per unit time which is consumed by autonomous driving can change according to the degree of dependence of recognition, decision, and operation in driving on an autonomous driving system. In general, when the degree of dependence on the autonomous driving system increases, the amount of power consumed per unit time increases.

Meanwhile, from the perspective of burden on the environment, an electric automobile that travels using, as a power source, a motor that operates on power accumulated in an in-vehicle battery is expected to come into widespread use in coming years.

When a case in which such an automobile can perform autonomous driving is assumed, the power in the in-vehicle battery is consumed by both the autonomous driving system and the motor. Thus, a traveling distance relative to the remaining charge in the battery changes according to the degree of dependence on the autonomous driving system.

However, none of the technologies described above do not consider the state of the in-vehicle battery. Thus, for example, with a route including a section on which the vehicle is to travel by autonomous driving and that is to be presented to a user, a situation in which the vehicle cannot arrive at a destination with the remaining battery charge can occur.

In order to overcome such a problem, An information processing apparatus comprising: a processor; and a memory storing thereon a computer program, which when executed by the processor, causes the processor to perform operations including: obtaining power consumption information indicating an amount of power consumption of a module used in autonomous driving of a vehicle using (i) unit-power consumption information of the module and (ii) destination information indicating a place to which the vehicle is to travel; obtaining output information using the power consumption information; and outputting the output information.

This allows an autonomous vehicle to utilize information that is based on the amount of power to be consumed by autonomous driving and that needs to be considered for traveling to a destination.

For example, the operations may further include: obtaining battery information indicating a remaining charge in a battery included in the vehicle. The output information may include (A) the power consumption information or (B) information indicating a remaining battery charge after the autonomous driving, (B) the information is obtained using (i) the battery information and (ii) the power consumption information. As a specific example, the output information may include (i) a difference between the remaining battery charge indicated by the battery information and the amount of power consumption indicated by the power consumption information, (ii) the amount of power consumption indicated by the power consumption information or (iii) a conversion value obtained by converting the difference or the amount of power consumption into another unit.

This makes it possible to utilize information regarding the battery state that changes until the vehicle arrives at the destination.

For example, the vehicle may travel by using, as a power source, a motor that operates on power from the battery.

Thus, the remaining battery charge in a battery whose remaining battery charge varies greatly depending on power consumed by operations other than autonomous driving is obtained.

For example, the operations may further include: obtaining route information indicating a route along which the vehicle is to travel using the destination information. The power consumption information may be obtained further based on the route information. The output information may include at least one of (A) a travel mode regarding the autonomous driving of the vehicle and (B) a section that is included in the route and on which the vehicle is to travel by the autonomous driving, each of (A) the travel mode and (B) the section is obtained using (i) the power consumption information and (ii) the battery information. As a specific example, the output information may include at least one of (i) the travel mode in which the amount of power consumption indicated by the power consumption information is smaller than the remaining battery charge indicated by the battery information and (ii) the section with which the amount of power consumption indicated by the power consumption information is smaller than the remaining battery charge indicated by the battery information.

This makes it possible to realize autonomous driving in a travel mode or on a section determined considering power consumption according to a destination or a route.

For example, the operations may further include: obtaining a designated travel mode regarding the autonomous driving of the vehicle; and obtaining candidate route information indicating a candidate route that is a candidate on which the vehicle is to travel using the destination information. The power consumption information is obtained using the candidate route information. The output information includes at least one of (A) a section on which the vehicle is to travel by the autonomous driving from the candidate route and (B) the candidate route including at least a part on which the vehicle is to travel in the designated travel mode, each of (A) the section and (B) the candidate route is obtained using the battery information, the designated travel mode, and the power consumption information. As a specific example, the output information may include at least one of (i) the section with which the amount of power consumption indicated by the power consumption information is smaller than the remaining battery charge indicated by the battery information when the autonomous driving is performed in the travel mode and (ii) the candidate route with which the amount of power consumption indicated by the power consumption information is smaller than the remaining battery charge indicated by the battery information when the autonomous driving is performed in the travel mode.

This makes it possible to realize autonomous driving on a route or a section determined considering power consumption according to a destination and a travel mode.

For example, the operations may further include: obtaining autonomous-driving-requested section information indicating at least a partial section of a route on which the vehicle is requested to travel by autonomous driving; and obtaining candidate route information indicating a candidate route that is a candidate on which the vehicle is to travel using the destination information. The power consumption information is obtained using the candidate route information. The output information includes at least one of (A) a travel mode regarding the autonomous driving of the vehicle on the section and (B) a candidate route including the section, each of (A) the travel mode and the (B) the candidate rout is obtained using the battery information, the autonomous-driving-requested section information, and the power consumption information. As a specific example, the output information includes at least one of (i) the travel mode in which the amount of power consumption indicated by the power consumption information on the section is smaller than the remaining battery charge indicated by the battery information when the autonomous driving is performed and (ii) the candidate route including the section with which the amount of power consumption indicated by the power consumption information on the section is smaller than the remaining battery charge indicated by the battery information when the autonomous driving is performed.

This makes it possible to realize autonomous driving on a route or in a travel mode determined considering power consumption according to a destination and a section for which autonomous driving is requested.

For example, the output unit may include an autonomous driving controller that controls the autonomous driving of the vehicle, and the output controller may cause the autonomous driving controller to control the autonomous driving of the vehicle in accordance with the output information.

Thus, the autonomous driving is controlled based on information obtained considering power to be consumed up to a destination.

For example, the outputting of the output information outputs the output information to a presenting unit, for example display, that presents the output information to a user. The obtaining of the output information obtains second output information using user input information that the user inputs in response to the output information presented by the presenting unit. The outputting of the output information outputs the second output information to the autonomous driving controller to cause the autonomous driving controller to control the autonomous driving of the vehicle. As a specific example, the user input information includes a result of the user's selection of details of the autonomous driving from the presented output information. In accordance with the result, the second output information includes (i) a route along which the vehicle is to travel with which the amount of power consumption indicated by the power consumption information is smaller than a remaining battery charge indicated by battery information, (ii) a travel mode regarding the autonomous driving of the vehicle with which the amount of power consumption indicated by the power consumption information is smaller than the remaining battery charge indicated by the battery information, and (iii) a section that is included in the route and on which the vehicle is to travel by the autonomous driving with which the amount of power consumption indicated by the power consumption information is smaller than the remaining battery charge indicated by the battery information.

Thus, the information obtained considering the power to be consumed up to the destination is presented to the user, and the autonomous driving is controlled based on the user's instruction in response to the information.

For example, the output unit may include a communication unit that transmits the second output information to the autonomous driving controller, and the output controller may cause the communication unit to transmit the second output information.

Thus, information based on information obtained considering the power to be consumed up to the destination is provided to equipment that uses the information to control the autonomous driving of the vehicle.

For example, a module used in the autonomous driving may include at least one of a sensor and a processor.

This realizes traveling of an autonomous vehicle up to a destination, considering the amount of power consumed by the sensor or the processor used in autonomous driving.

For example, the module in the autonomous driving may include a basic traveling system of a vehicle.

This realizes traveling of an autonomous vehicle up to a destination, considering power to be consumed on a route by the basic traveling system.

An information processing method, comprising: obtaining power consumption information indicating an amount of power consumed by a module used in autonomous driving of a vehicle using (i) unit-power consumption information of the module and (ii) destination information indicating a place to which the vehicle is to travel; obtaining output information using the power consumption information; and outputting the output information.

This allows an autonomous vehicle to utilize information that is based on the amount of power to be consumed by autonomous driving and that needs to be considered for traveling to a destination.

It should be noted that general or specific embodiments may be implemented as a system, a method, an integrated circuit, a computer program, a computer-readable storage medium such as a CD-ROM, or any selective combination thereof.

Embodiments will be described below in detail with reference to the accompanying drawings.

The embodiments described below each represent a general or specific example. Numerical values, shapes, materials, constituent elements, the arrangement positions and connection forms of constituent elements, steps, the order of steps, and so on described in the embodiments below are examples and are not intended to limit the present disclosure. Of the constituent elements in the embodiments described below, the constituent elements not set forth in the independent claims that represent the broadest concept will be described as optional constituent elements.

First Embodiment

FIG. 1 is a block diagram illustrating one example of the functional configuration of an information processing apparatus in a first embodiment.

An information processing apparatus 100 in the first embodiment is provided in a vehicle 10. The vehicle 10 is an electric automobile that includes a battery 300 and that travels by using, as a power source, a motor (not illustrated) that operates on power from the battery 300.

The information processing apparatus 100 is implemented by, for example, an in-vehicle microcontroller including a processor and a memory. The information processing apparatus 100 includes functional constituent elements described below. In the information processing apparatus 100, the processor executes a program stored in the memory to thereby realize the constituent elements.

The information processing apparatus 100 includes a route information obtainer 110, a sensor-used identifier 120, a sensor-related power consumption estimator 130, a travel mode obtainer 140, a battery information obtainer 150, an output information obtainer 180, and an output controller 190.

The route information obtainer 110 obtains route information indicating a route to a destination and based on map data 200 included in the vehicle 10.

The "map data 200" as used herein refers to, for example, map data pre-included in a car navigation system (not illustrated) in the vehicle 10. Alternatively, the map data 200 may be map data that the car navigation system obtains through communication with an external map server, as needed.

The destination is a destination to which the vehicle 10 that a user is riding is to travel, and is indicated by destination information, which is, for example, based on the user's input to the car navigation system or to a portable terminal, such as a smartphone, connected to the car navigation system via communication. The car navigation system calculates a route along which the vehicle 10 is to travel, based on the destination information, and provides route information indicating the route to the route information obtainer 110.

Also, when the calculated route includes a section on which a condition for autonomous driving, for example, a public or private restriction regarding whether or not autonomous driving can be executed or regarding the degree of dependency (hereinafter may also be referred to as a "level of autonomous driving") on an autonomous driving system (hereinafter may also be referred to as an "autonomous driving controller") for controlling the autonomous driving of the vehicle 10, is set, the route information may further include the section and information indicated by the condition. A section on which the autonomous driving can be performed is hereinafter referred to as an "autonomously drivable section". Information indicating the autonomously drivable section included in the route information may be, for example, information derived from the map data 200, information added to the route information by a user, or information incorporating a result of learning performed based on actual records of traveling of the vehicle 10.

The travel mode obtainer 140 obtains travel mode information indicating a travel mode to be used in the vehicle 10.

The "travel mode that is obtained" in this case is a travel mode selected from a plurality of travel modes by the user and designated as a travel mode for autonomous driving of the vehicle 10, and the level of autonomous driving of the vehicle 10 differs between the travel modes. For example, in one travel mode, the user always performs, as a driver, operations for acceleration, steering, and control, based on his or her recognition and decision. In another travel mode, typically, the autonomous driving controller performs those operations based on recognition and decision made by a processor for processing data from various vehicle-mounted sensors. However, the user can take an action, such as performing those operations by himself or herself in accordance with a request from the autonomous driving controller.

In the case of the two travel modes described above as examples, the reason why the amount of power consumed by the autonomous driving controller is larger in the latter travel mode, which has a higher degree of dependence on the autonomous driving controller, has been described in "Findings Underlying Present Disclosure" above.

The user designates a travel mode he or she desires to use for the vehicle 10 on an autonomously drivable section in the route, by selecting the travel mode and, for example, inputting the selected travel mode via a user interface of the car navigation system.

The sensor-used identifier 120 identifies a vehicle-mounted sensor to be used in the travel mode indicated by the travel mode information obtained by the travel mode obtainer 140. Examples of the vehicle-mounted sensor as used in this case include a visible-light sensor (an image capture device), an infrared sensor, a millimeter-wave radar, and a light detection and ranging (LiDAR) sensor for mainly sensing a situation outside a vehicle and a temperature sensor, an acceleration sensor, a pressure sensor, and an angle sensor for mainly sensing a situation of a vehicle. However, the types of sensor that can be identified by the sensor-used identifier 120 and the application of various sensors are not limited to this example. In the case of a sensor whose use state changes depending on the travel mode and whose amount of power consumption changes in accordance with the change, the sensor may be identified by the sensor-used identifier 120, regardless of the application of the sensor.

The sensor-related power consumption estimator 130 estimates the amount of power consumed by the sensor, identified by the sensor-used identifier 120, when the vehicle 10 is performing autonomous driving. More specifically, for example, the amount of power consumed by each sensor which is based on an estimated time for going through an autonomously drivable section in the route is estimated using information about the amount of power consumed by the sensor per unit time, the information being pre-stored in the memory in the information processing apparatus 100 (the information about the amount of power consumed per unit time may also be hereinafter referred to as "unit-power consumption information"). For example, this unit-power consumption information is held in a memory in a sensor module including the sensor and is obtained from the sensor module. Alternatively, the unit-power consumption information may be written in a memory in an electric control unit (ECU) in the vehicle 10 during manufacture of the vehicle 10 and be provided, may be input by the user, or may be calculated by the information processing apparatus 100 based on actual records of the amount of power consumed in a predetermined period of time.

For example, if the unit amount of power consumed by an infrared sensor that the vehicle 10 uses to detect an obstacle in the surroundings thereof during autonomous driving is 10 mWh, and the amount of time estimated to go through an autonomously drivable section in the route indicated by the route information is 0.5 hour, then the estimated amount of power consumed by the infrared sensor on the route is 5 mWh.

When the sensor-used identifier 120 identifies a plurality of sensors, the amounts of power consumed by the respective sensors are estimated.

In addition, the sensor-related power consumption estimator 130 also estimates the amount of power that the processor consumes to process data to be output by each identified sensor. Estimating this amount of power is performed, for example, using a scheme that is the same as or similar to the scheme for estimating the amount of power consumed by each sensor. That is, the amount of power consumption is estimated using the unit-power consumption information for processing data from each sensor, the information being pre-stored in the memory in the information processing apparatus 100, and based on the estimated amount of time taken to go through the autonomously drivable section in the route. Alternatively, the amount of power consumption may be estimated based on an operation clock of the processor, the operation clock being determined when the processor is processing data from each sensor. When the sensor-used identifier 120 identifies a plurality of sensors, the amounts of power consumed for processing data from the respective sensors are estimated.

As described above, the sensor-related power consumption estimator 130 obtains power consumption information indicating the amounts of power consumed by each sensor and the processor used in autonomous driving to be performed on a route to the destination, the power consumption information corresponding to destination information indicating a destination indicating a place to which the vehicle 10 is to travel and unit-power consumption information of each sensor and the processor.

Each sensor and the processor described above are examples of modules used in autonomous driving of a vehicle in the present embodiment. The sensor-related power consumption estimator 130 as described above is also an example of a power consumption information obtainer in the present embodiment.

The battery information obtainer 150 obtains battery information indicating the remaining charge in the battery 300 included in the vehicle 10, as needed.

The output information obtainer 180 obtains output information based on the power consumption information obtained by the sensor-related power consumption estimator 130 and the battery information. The output controller 190 outputs the output information to the output unit, which uses the output information.

The "output information" as used herein refers to, for example, information to be presented to the user. More specifically, the information to be presented to the user is, for example, the amount of power consumed for autonomous driving of the vehicle 10 on a route to a destination, the present amount of charge in the battery 300, a difference (i.e., an estimated remaining charge in the battery 300 after the autonomous driving) between the amount of power consumed for the autonomous driving and the present amount of charge in the battery 300, or a combination thereof. By obtaining image data indicating such information from the memory or generating the image data, the output information obtainer 180 obtains the output information. In this case, the output controller 190 receives the output information from the output information obtainer 180, and then an output unit 400 receives the output information from the output controller 190. The output unit 400 is a video display device, such as a monitor, included in the vehicle 10.

The output information may be information obtained by converting the amount of power consumed for the autonomous driving into another unit. For example, the output information may indicate an electricity cost or the period of time taken to accumulate power corresponding to the amount of power consumed for the autonomous driving. In addition, for example, the output information may be an estimated travel distance or an estimated travel time for the present travel mode or for each travel mode, the travel distance or the travel time being achievable using the estimated remaining charge in the battery 300 after the autonomous driving.

The output information obtainer 180 may obtain, instead of or in addition to the image data, sound data including similar information from the memory or generating the sound data. In this case, the output unit 400 that receives the output information from the output controller 190 is a speaker included in the vehicle 10.

In another example, when the vehicle 10 includes a display that presents such information, the output information obtainer 180 may generate and obtain a signal for instructing the display about a display form. In such a case, the output unit 400 is the display.

Each of or an arbitrary combination of the video display device, the speaker, and the display, which are described above as specific examples of the output unit 400, is an example of a user presenter in the present embodiment. Output performed by the output unit 400 is presentation performed so that the user can perceive.

Also, the output unit 400 may be an autonomous driving controller, and the output information may be information used by the autonomous driving controller. For example, what is indicated by the output information is the same as that described above, and by using the information, the autonomous driving controller may change details of control, for example, the travel mode, in autonomous driving, and may perform control on the basic traveling system for at least one of acceleration, steering, and braking in accordance with the changed travel mode. Such a change can be made, for example, in order to reduce the amount of power consumption. Alternatively, the change of the travel mode may be made by the information processing apparatus 100, based on the power consumption information and the battery information. The output information in this case indicates the level of autonomous driving after correction. Also, the output performed by the output unit 400 is that the autonomous driving controller sends a control signal regarding acceleration, steering, or breaking to the basic traveling system.

When the travel mode is changed as described above, the user presenter presents information to that effect to the user. The information to be presented by the user presenter is also the output information obtained by the output information obtainer 180 and is sent from the output controller 190 to the user presenter.

In the information processing apparatus 100 configured as described above, processing on information regarding autonomous driving is performed considering the state of the battery 300 included in the vehicle 10. More specifically, for example, information indicating the amount of power consumed in autonomous driving on a route to a destination is processed for presentation to the user through use of an image or the like. In another example, processing is performed on the power consumption information and the battery information to thereby calculate a difference between the amount of power consumed for autonomous driving on a route to a destination and the remaining charge in the battery 300, the difference being used in order to determine a travel mode to be used on an autonomously drivable section.

The configuration of the information processing apparatus 100 in the present embodiment and peripheral elements of the battery 300 and so on have been described thus far in conjunction with the examples. However, the information processing apparatus 100 and the environment in which the information processing apparatus 100 is used are not limited to the above-described examples.

For example, although a route along which the vehicle 10 is to travel is calculated based on the destination information, the route does not necessarily have to be calculated. More specifically, for example, the route information obtainer 110 may determine an amount of time for which the vehicle 10 is to travel by autonomous driving, by referring to the map data and on the basis of an approximate distance from a present place or a place of departure to a destination, and the sensor-related power consumption estimator 130 may obtain power consumption information in accordance with the determined amount of time. In this case, for example, the power consumption information may be obtained based on an assumption that the vehicle 10 travels along the route to the destination by autonomous driving. Also, for example, the power consumption information may be obtained based on an assumption that autonomous driving or driving performed by the user himself or herself is performed for a duration (e.g., 30 minutes) or a percentage (e.g., 50% of a required time) that is predetermined by the user.

The information to be presented to the user may also be only the amount of power consumed for autonomous driving of the vehicle 10 on a route to a destination. The user can use the information, for example, as information for making a decision in changing the level of autonomous driving (or the travel mode) or changing the section along which or the duration for which the vehicle 10 is to travel by autonomous driving.

In addition, for example, the number of routes calculated based on the destination information may be one or more, and when the number of calculated routes is two or more, some or all of the routes may be presented to the user. The user may input a route selected from the presented routes to the information processing apparatus 100 via a user interface (not illustrated), such as a touch panel, a button, or a microphone.

Also, the amount of power consumption indicated by the power consumption information may be only the amount of power consumed by one of the sensor(s) and the processor among modules used in the autonomous driving. For example, when the amount of power consumed by a particular one of the sensor(s) and the processor is smaller than the amount of power consumed by the other module and accounts for only a fraction of a ratio to the amount of power consumed by the entire vehicle 10, the power consumption information does not necessarily have to indicate the amount of power consumed by the particular module. This makes it possible to reduce the amount of load on processing performed by the processor in the information processing apparatus 100.

A change of the travel mode may be reported from the information processing apparatus 100 to the user. In such a case, the user may be caused to select the changed travel mode or to designate a section in a route on which the travel mode that the user selects is to be used in the vehicle 10.

Also, information indicating a section on which traveling of the vehicle 10 by autonomous driving is requested by the user may further be given to the information processing apparatus 100 for consideration.

The following description will be given of an embodiment including processing of a larger amount of information, as described above, or processing performed in a more complicated process.

Second Embodiment

Figure 2A:
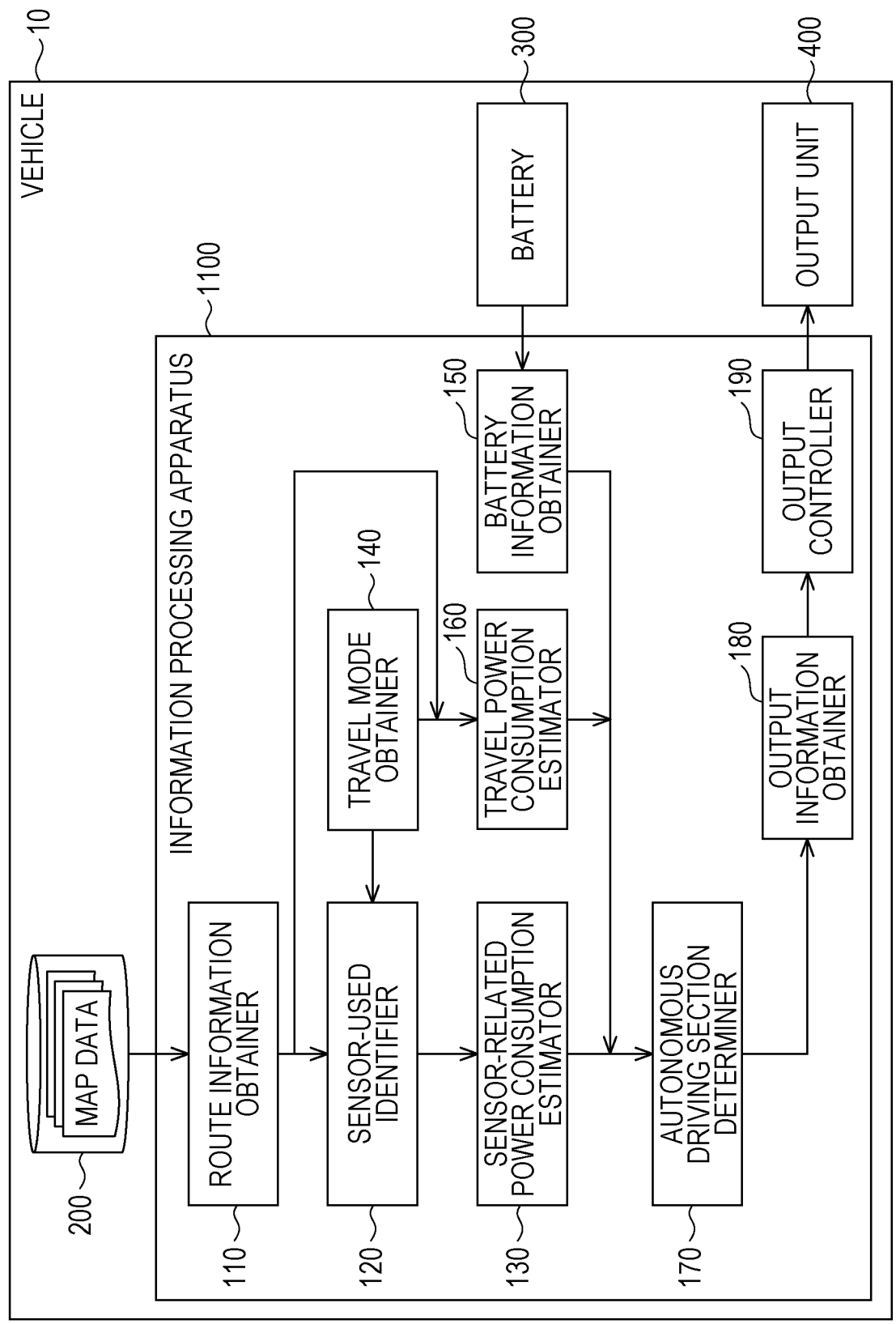
FIG. 2A is a block diagram illustrating one example of the functional configuration of an information processing apparatus in a second embodiment.

FIG. 2A is a block diagram illustrating one example of the functional configuration of an information processing apparatus in a second embodiment.

Similarly to the information processing apparatus 100, an information processing apparatus 1100 in the second embodiment is also provided in a vehicle 10 that can travel by autonomous driving. The following description of the information processing apparatus 1100 will be mainly given of differences from the information processing apparatus 100 in the first embodiment. Constituent elements that are the same as or similar to those in the information processing apparatus 100 are denoted by the same reference numerals, and detailed descriptions thereof may be omitted, or descriptions thereof may be given briefly.

In response to an input of information indicating a route along which the vehicle 10 travels to a destination, the information processing apparatus 1100 performs processing for outputting information indicating a section on which the vehicle 10 can travel by autonomous driving.

The information processing apparatus 1100 includes a route information obtainer 110, a sensor-used identifier 120, a sensor-related power consumption estimator 130, a travel mode obtainer 140, a battery information obtainer 150, an output information obtainer 180, and an output controller 190, as in the information processing apparatus 100. The information processing apparatus 1100 further includes a travel power consumption estimator 160 and an autonomous driving section determiner 170.

The information processing apparatus 1100 can also be implemented by an in-vehicle microcontroller, as in the information processing apparatus 100, and the travel power consumption estimator 160 and the autonomous driving section determiner 170 are also functional constituent elements of the information processing apparatus 1100. In the information processing apparatus 1100, a processor executes a program stored in a memory to thereby realize the constituent elements.

Based on route information obtained by the route information obtainer 110 and travel mode information obtained by the travel mode obtainer 140, the travel power consumption estimator 160 estimates the amount of power that a basic traveling system consumes on a route along which the vehicle 10 is to travel. More specifically, for example, by using unit-power consumption information of the basic traveling system, the information being stored in the memory in the information processing apparatus 100, the travel power consumption estimator 160 estimates the amount of power consumption based on an estimated time taken for travel to a destination along a route. In the present embodiment, the basic traveling system is also one example of modules used in autonomous driving of a vehicle.

In this case, the amount of power consumption indicated by the unit-power consumption information for the basic traveling system is the amount of power consumed by constituent elements of the vehicle 10 which operate on power from the battery 300 during traveling, even when it is not autonomous driving. Examples of such constituent elements include motors and various actuators that operate during traveling. The unit-power consumption information may further indicate the amount of power that is consumed by lights, wipers, a car navigation system, air-conditioning equipment, audio and video equipment, sensors, and an electric control unit (ECU) and that is dependent on the situation. For example, when the unit-power consumption information indicates the amount of power consumed by wipers and lights, the travel power consumption estimator 160 can more accurately estimate the amount of power consumed at night in a rainy day. The unit-power consumption information is, for example, written to a memory in the ECU in the vehicle 10 during manufacture of the vehicle 10 and is provided. Alternatively, the unit-power consumption information may be input by the user or may be calculated by the information processing apparatus 100 on the basis of actual records of the amount of power consumed in a predetermined period of time (e.g., the last week) and be written to the memory. The unit-power consumption information may also individually indicate the amount of power consumed by traveling by autonomous driving and the amount of power consumed by traveling by driving by the user.

The travel power consumption estimator 160 as described above is an example of a power consumption information obtainer in the present embodiment.

Hereinafter, for discrimination and simplification, the amount of power consumption which is estimated by the sensor-related power consumption estimator 130 is referred to as a "first amount of power consumption", and the amount of power consumption which is estimated by the travel power consumption estimator 160 is referred to as a "second amount of power consumption".

The autonomous driving section determiner 170 decides whether or not an entire autonomously drivable section in a route indicated by the route information can be autonomously traveled in a travel mode designated by the user, based on information indicating the amount of power estimated to be consumed by the vehicle 10 during traveling along the route, that is, the first amount of power consumption and the second amount of power consumption (in the present embodiment, power consumption information according to the destination information, the unit-power consumption information, and the route information) and the remaining charge in the battery 300. On the basis of a result of the decision, a section on which the vehicle 10 is to travel by autonomous driving is also determined (this section may also be referred to as an "autonomously driven section"). Processes for the decision and the determination are described later with reference to FIG. 2B.

The output information obtainer 180 in the present embodiment obtains, as the output information, information resulting from processing performed by the autonomous driving section determiner 170. The output controller 190 outputs the output information to the output unit 400, which uses the output information.

The "output information" as used herein refers to, for example, information to be presented to the user and indicates at least an autonomous-driving-scheduled section determined by the autonomous driving section determiner 170. By obtaining image data indicating such information from the memory or generating the image data, the output information obtainer 180 obtains the output information. The image data may include part of the map data 200. Also, the output information obtainer 180 may obtain sound data, as in the first embodiment. A user presenter, such as a video display device, that serves as the output unit 400 presents those pieces of data so that they can be perceived by the user.

Also, the output unit 400 may be an autonomous driving controller, and the output information may be information used by the autonomous driving controller. For example, the output information may include an instruction indicating start or stop of autonomous driving or a travel mode to be used. The output information including the instruction is sent, for example, from the output controller 190 to the autonomous driving controller in the vehicle 10 that is traveling on a route. In accordance with the instruction indicated by the output information, the autonomous driving controller sends a control signal regarding at least one of acceleration, steering, and braking to the basic traveling system.

Figure 2B:
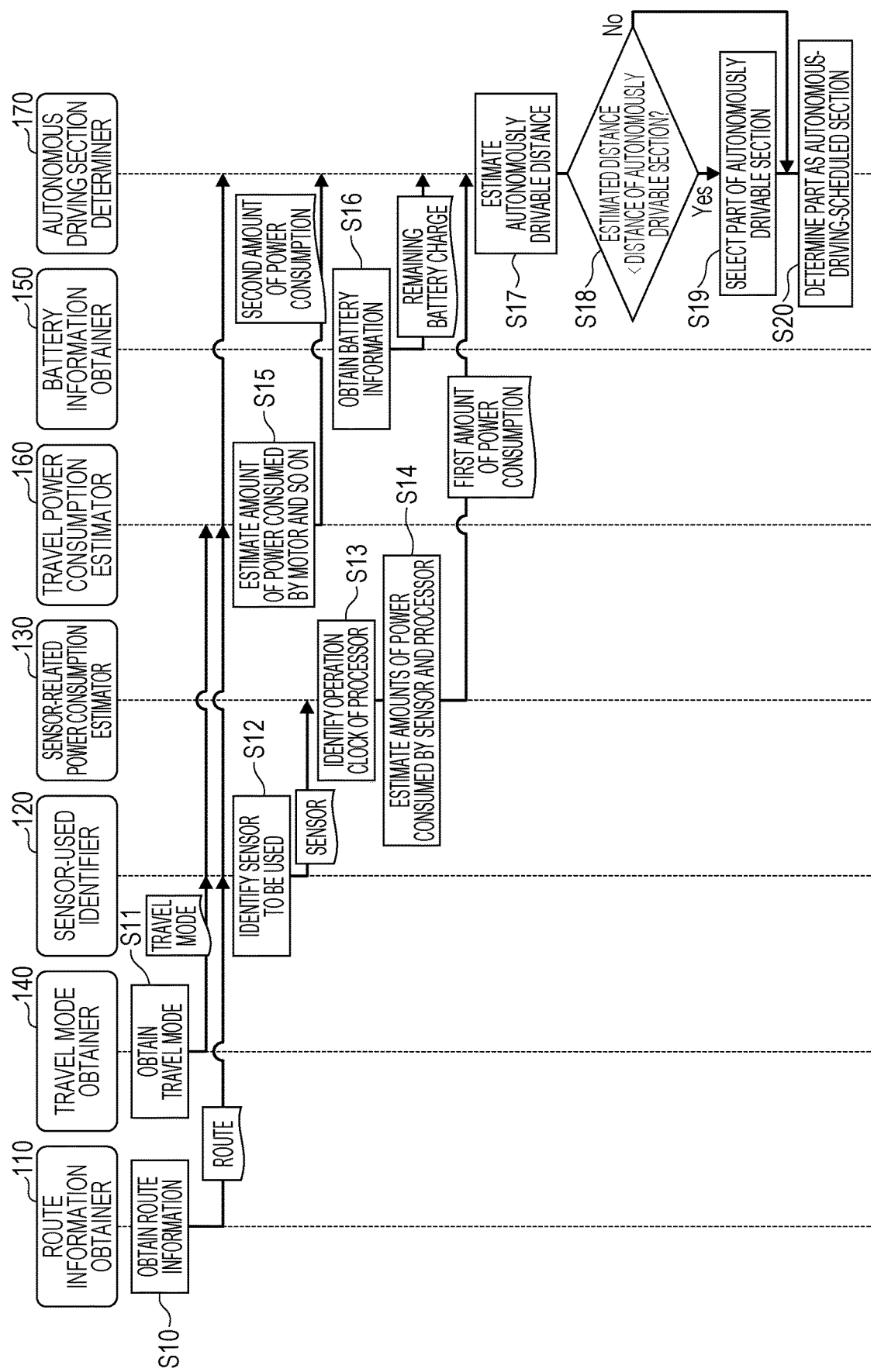
FIG. 2B is a sequence diagram illustrating processing performed by the information processing apparatus in the second embodiment.

One example of processing performed by the information processing apparatus 1100 will now be described with reference to FIG. 2B. FIG. 2B is a sequence diagram illustrating one example of processing performed by the information processing apparatus 1100.

First, the route information obtainer 110 obtains route information indicating a route to a destination indicated by destination information, the route information being based on the map data 200 (step S10).

The travel mode obtainer 140 obtains travel mode information indicating a travel mode regarding the autonomous driving of the vehicle 10 (step S11).

The aforementioned destination and travel mode are a destination and a travel mode that the user inputs, for example, via a user interface of a car navigation system and are respectively supplied to the information processing apparatus 1100 as destination information and travel mode information.

After step S11, the sensor-used identifier 120 identifies a vehicle-mounted sensor to be used in the travel mode indicated by the travel mode information (step S12).

Next, the sensor-related power consumption estimator 130 estimates the amount of power that the sensor identified by the sensor-used identifier 120 consumes when the vehicle 10 is performing autonomous driving and the amount of power that the processor consumes to process data output by the sensor (step S14). In this example, the operation clock of the processor is identified (step S13), and the amount of power consumed by the processor is estimated based on the operation clock. FIG. 2B illustrates the two amounts of power estimated by the sensor-related power consumption estimator 130 in conjunction with the first amount of power consumption.

The travel power consumption estimator 160 estimates the amount of power that corresponds to the route information obtained by the route information obtainer 110 and the travel mode information obtained by the travel mode obtainer 140 and that a motor and so on in the basic traveling system consume on the route along which the vehicle 10 is to travel (step S15). The amount of power estimated by the travel power consumption estimator 160 in step S15 is illustrated as "second amount of power consumption" in FIG. 2B.

The battery information obtainer 150 obtains battery information indicating the remaining charge in the battery 300 included in the vehicle 10 (step S16).

Next, based on the first amount of power consumption, the second amount of power consumption, and the battery information, the autonomous driving section determiner 170 determines whether or not the vehicle 10 can travel autonomously along an entire autonomously drivable section in the route indicated by the route information by using the designated travel mode. An example procedure of this determination will be described below.

First, based on the first amount of power consumption, the second amount of power consumption, and the battery information, the autonomous driving section determiner 170 estimates an autonomously drivable maximum distance in the designated travel mode (step S17).

Next, a determination is made as to whether or not the estimated maximum distance is smaller than the distance of the autonomously drivable section indicated by the route information (step S18). If the estimated distance is larger than or equal to the distance of the autonomously drivable section (No in step S18), the entire autonomously drivable section is determined as a section on which the vehicle 10 is to travel by autonomous driving (this section may also be referred to as an "autonomous-driving-scheduled section") (step S20). If the estimated distance is smaller than the distance of the autonomously drivable section (Yes in step S18), a part of the autonomously drivable section is selected and is determined as an autonomous-driving-scheduled section (steps S19 and S20).

Thereafter, the output information obtainer 180 obtains output information indicating the autonomous-driving-scheduled section determined in step S20, and the output controller 190 output the output information to the output unit 400.

The processes in steps S16 to S20 described above are examples, and various modifications can be made thereto.

For example, instead of estimating the maximum distance in step S17, the amount of power consumed by traveling of the vehicle 10 along the entire route may be estimated in accordance with the distance of the autonomously drivable section included in the route and the distance of the other section(s) included therein. In this case, in step S18, based on whether or not the estimated amount of power is larger than the remaining battery charge indicated by the battery information, a determination is made as to whether or not traveling including the autonomous driving of the vehicle 10 can be performed as desired by the user.

Also, for example, when the route information does not indicate an autonomously drivable section, an entire route indicated by the route information may be treated as an autonomously drivable section in each of the steps.

For example, in step S19, the autonomous driving section determiner 170 may select a part of the autonomously drivable section in accordance with a predetermined condition. The predetermined condition is about, for example, a part closer to or farther from a destination, a part on which the vehicle 10 is to travel in a darker time segment, and a part on which traffic is heavy. Verification against such a condition can be executed using map data, time point information, or traffic information that can be obtained by the information processing apparatus 100. Alternatively, the user's input about selection of the map data, the time point information, or the traffic information may be received. Also, the selection may be performed according to the user's state (a fatigue state or an arousal state). For example, when it is determined that the user's state is a predetermined state (e.g., the fatigue state), a section that is close to a point of departure or a present location is selected as an autonomously drivable section. The user's state may also be determined based on sensor information obtained from an imaging sensor, such as a camera, or a sound sensor, such as a microphone, provided in the vehicle 10, or a biometric sensor worn by the user.

An example of an output when the output unit 400 is the user presenter will be described with reference to FIGS. 3A and 3B. Each of FIGS. 3A and 3B illustrates one example of a screen that is displayed on a video display device included in the vehicle 10, the display being obtained as a result of processing performed by the information processing apparatus 1100.

Figure 3A:
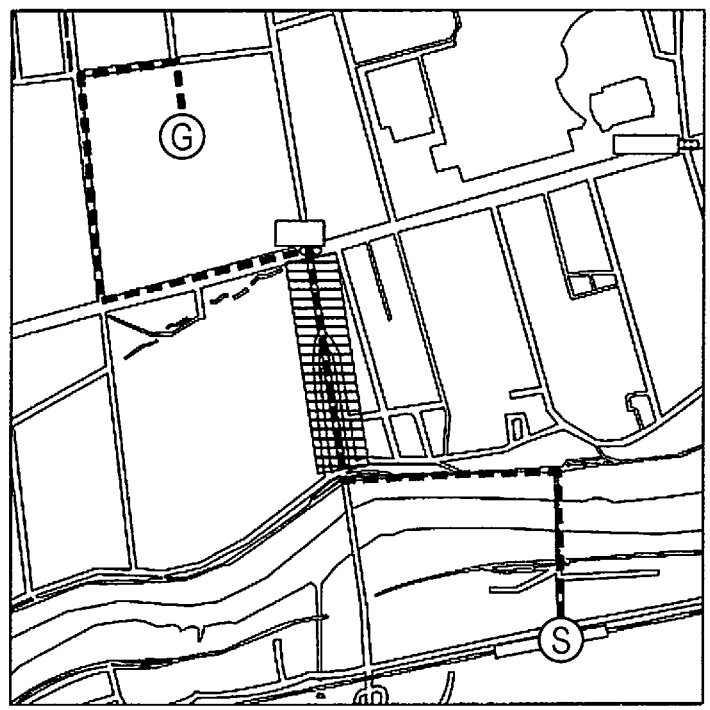
FIG. 3A illustrates one example of a screen displayed on a video display device as a result of processing performed by the information processing apparatus in the second embodiment and so on, the video display device being included in a vehicle.
Figure 3B:
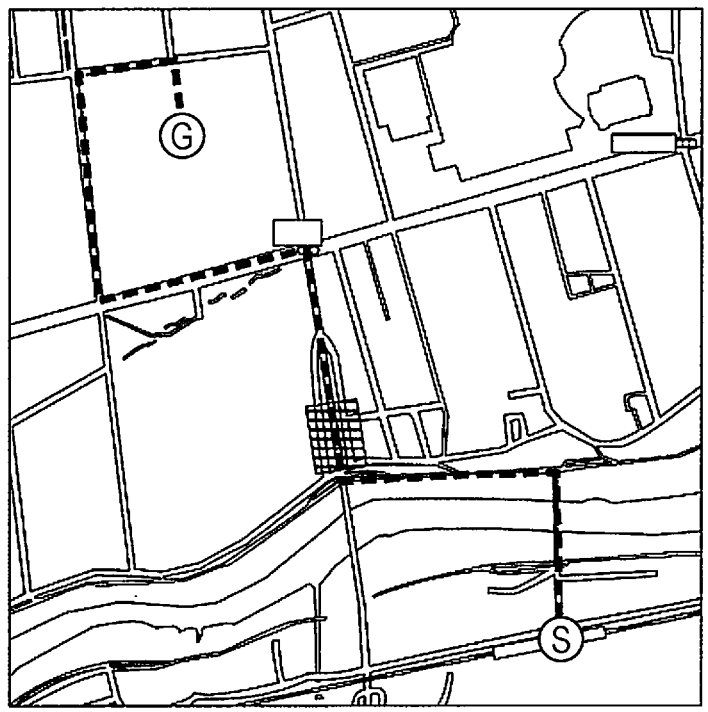
FIG. 3B illustrates another example of the screen displayed on the video display device as a result of processing performed by the information processing apparatus in the second embodiment and so on, the video display device being included in the vehicle.

On the screen illustrated in each of FIGS. 3A and 3B, a route along which the vehicle 10 is to travel is indicated by a dashed line. Also, "S" displayed on each screen indicates the present location of the vehicle 10 or a place of departure, and "G" indicates a destination. As shown in FIGS. 3A and 3B, the routes displayed on the two screens are the same.

The hatched rectangle that overlaps the dashed line indicating the route on each screen indicates an autonomous-driving-scheduled section. A difference between FIG. 3A and FIG. 3B occurs due to a difference in a result of the determination made in step S18. The screen illustrated in FIG. 3A is an example of a screen displayed when a result of the determination in step S18 is No and an entire autonomously drivable section is determined as an autonomous-driving-scheduled section. The screen illustrated in FIG. 3B is an example of a screen displayed when a result of the determination in step S18 is Yes and a part of the autonomously drivable section is selected and is determined as an autonomous-driving-scheduled section.

As described above, with respect to information about the amount of power consumed by the vehicle 10 and information about the remaining charge in the battery 300, the information processing apparatus 1100 can perform processing for determining a section on which the vehicle 10 is to travel by autonomous driving, the section being included in a route indicated by the route information. The information processing apparatus 1100 can cause the user presenter to present the determined section to the user. The information processing apparatus 1100 can also cause the autonomous driving controller to send a control signal for controlling a basic control system in accordance with the determined section.

Modification of Second Embodiment

A modification of the second embodiment is one aspect of the present disclosure which can be implemented by basically the same configuration as that of the information processing apparatus 1100. Differences from the second embodiment will be mainly described below in this modification.

In this modification, unlike the second embodiment, the travel mode to be used in the vehicle 10 is changed from a travel mode designated by the user. In the second embodiment, in order to cause the vehicle 10 to travel along a route to a destination by using power already accumulated in the battery 300, the information processing apparatus 1100 reduces the distance of an autonomous-driving-scheduled section in accordance with the remaining battery charge, thereby reducing the amount of power to be consumed by modules used in autonomous driving. In this modification, instead of or in addition to reducing the distance of the autonomous-driving-scheduled section, the travel mode is changed. That is, the amount of power to be consumed by modules used in autonomous driving may be reduced by changing the travel mode to a travel mode in which the degree of dependence on the autonomous driving controller is lower.

Thus, when the information processing apparatus 1100 determines the travel mode to be used, the output information obtained by the output information obtainer 180 further indicates the travel mode determined by the information processing apparatus 1100.

Thus, for example, when the output unit 400 is the user presenter, the output unit 400 presents the travel mode to be used in the vehicle 10 on the autonomous-driving-scheduled section. For example, in the case of the screen illustrated in FIG. 3A or 3B, the color or the pattern of the rectangle indicating the autonomous-driving-scheduled section may be changed depending on the travel mode to be used.

For example, when the output unit 400 is the autonomous driving controller, the output unit 400 sends a control signal for controlling the autonomous driving system in accordance with the travel mode to be used in the vehicle 10 on the autonomous-driving-scheduled section.

In this modification, the output information may further indicate the autonomous-driving-scheduled section. The output information may also include the route information, and for example, when the output unit 400 is the user presenter, the route obtained by the route information obtainer 110 is displayed, as illustrated in FIG. 3A or 3B.

Third Embodiment

Figure 4A:
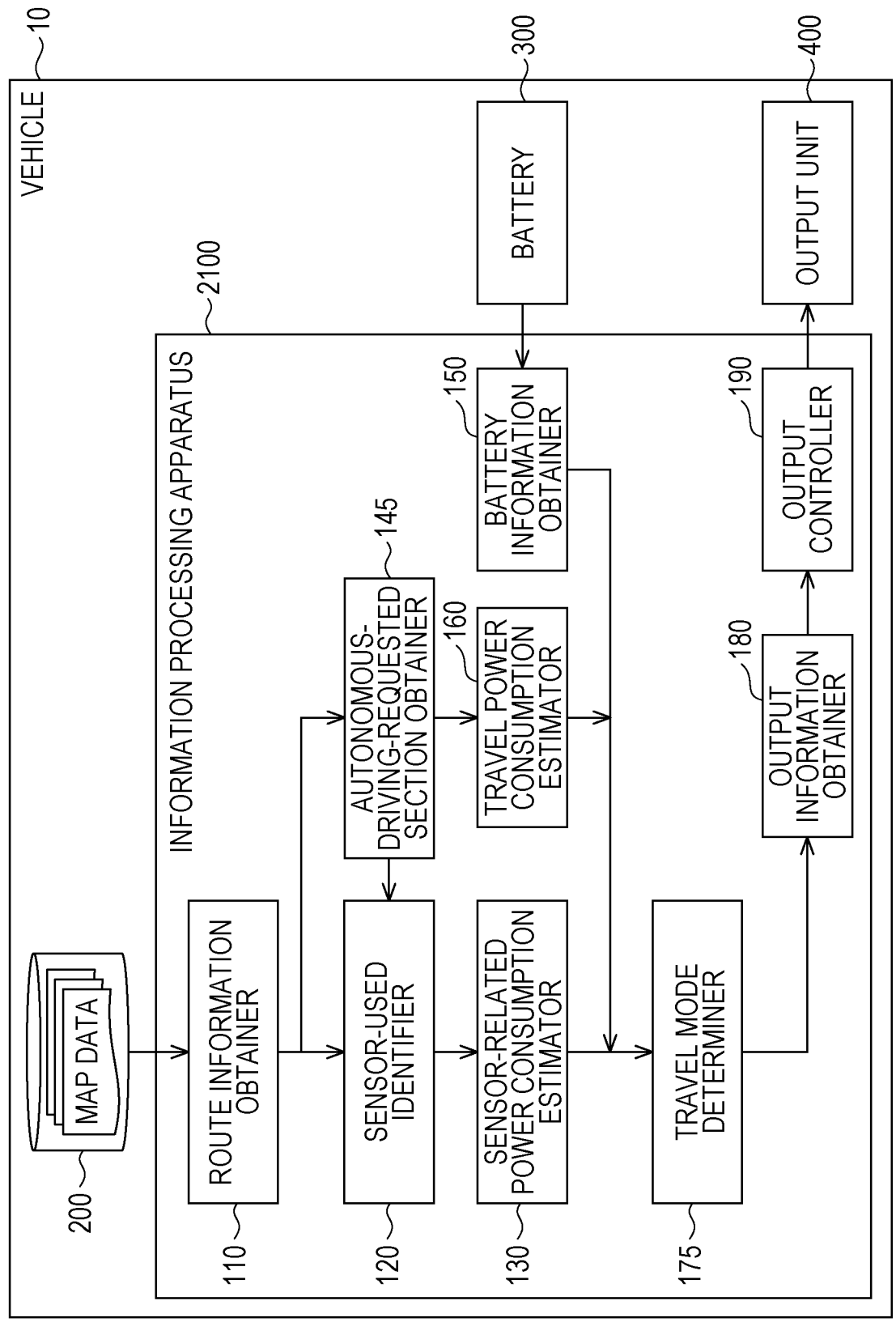
FIG. 4A is a block diagram illustrating one example of the functional configuration of an information processing apparatus in a third embodiment.

FIG. 4A is a block diagram illustrating one example of the functional configuration of an information processing apparatus in a third embodiment.

An information processing apparatus 2100 in the third embodiment is provided in a vehicle 10 that can travel by autonomous driving, similarly to the information processing apparatuses 100 and 1100. In the following description of the information processing apparatus 2100, differences from the information processing apparatus 100 in the first embodiment or the information processing apparatus 1100 in the second embodiment will be mainly described. Constituent elements that are the same as or similar to those in the information processing apparatus 100 are denoted by the same reference numerals, and detailed descriptions thereof may be omitted, or descriptions thereof may be given briefly.

In response to an input of information indicating a route along which the vehicle 10 is to travel to a destination and information indicating a section that is included in the route and on which the vehicle 10 is requested to travel by autonomous driving, the information processing apparatus 2100 performs processing for outputting information indicating the travel mode to be used in the vehicle 10 on the section.

Similarly to the information processing apparatus 100, the information processing apparatus 2100 includes a route information obtainer 110, a sensor-used identifier 120, a sensor-related power consumption estimator 130, a battery information obtainer 150, a travel power consumption estimator 160, an output information obtainer 180, and an output controller 190. The information processing apparatus 2100 further includes an autonomous-driving-requested section obtainer 145, instead of the travel mode obtainer 140. The information processing apparatus 2100 further includes the travel power consumption estimator 160, which is included in the information processing apparatus 1100 in the second embodiment, and includes a travel mode determiner 175 instead of the autonomous driving section determiner 170.

The information processing apparatus 2100 can also be implemented by an in-vehicle microcontroller, as in the information processing apparatuses 100 and 1100, and the autonomous-driving-requested section obtainer 145 and the travel mode determiner 175 are also functional constituent elements of the information processing apparatus 2100. In the information processing apparatus 2100, the processor executes a program stored in the memory to thereby realize the constituent elements.

The autonomous-driving-requested section obtainer 145 obtains information indicating a section that is at least a part of a route and on which traveling by autonomous driving is requested (this section is also referred to hereinafter as an "autonomous-driving-requested section"). The information indicating the section is, for example, information that the user input via a user interface of a car navigation system and that was supplied to the information processing apparatus 2100. Alternatively, information indicating autonomous-driving-requested sections may be pre-included in the map data. Examples of possible cases include a case in which there is are autonomous-driving-requested sections defined by a regulation or the like and a case in which the vehicle 10 performs learning based on actual records of traveling and a result of the learning is reflected. In such cases, based on the map data 200 that the route information obtainer 110 uses to obtain a route, the autonomous-driving-requested section obtainer 145 obtains information indicating an autonomous-driving-requested section.

The information indicating the autonomous-driving-requested section, the information being obtained by the autonomous-driving-requested section obtainer 145, can be used by the sensor-used identifier 120 and the travel power consumption estimator 160.

For example, depending on what type of place (e.g., a road for automobiles only, a school zone, or the like) on a route the autonomous-driving-requested section lies, the sensor-used identifier 120 may identify a sensor to be used for autonomous driving. The sensor to be used for autonomous driving may be identified for each travel mode that can be used on the autonomous-driving-requested section. Then, the sensor-related power consumption estimator 130 may obtain, for each travel mode, power consumption information indicating the amount of power to be consumed by modules used in the autonomous driving. In the present embodiment, the power consumption information obtained for each travel mode may also be referred to as a "first amount of power consumption".

The travel power consumption estimator 160 may obtain, for example, the distance of the autonomous-driving-requested section, and based on the distance, the travel power consumption estimator 160 may individually obtain the amount of power consumed by traveling by autonomous driving on the autonomous-driving-requested section and the amount of power consumed by traveling by driving by the user. In the present embodiment, the power consumption information obtained for each section is also referred to as a "second amount of power consumption".

Based on the first amount of power consumption, the second amount of power consumption, and the remaining battery charge indicated by the battery information obtained by the battery information obtainer 150, the travel mode determiner 175 determines a travel mode to be used in the vehicle 10 on the autonomous-driving-requested section. Processes for the determination are described later with reference to FIG. 4B.

The output information obtainer 180 in the present embodiment obtains, as the output information, information obtained as a result of the processing performed by the travel mode determiner 175. The output controller 190 outputs the output information to the output unit 400.

The "output information" as used in this case is, for example, information to be presented to the user and indicates at least the travel mode determined by the travel mode determiner 175. By obtaining image data indicating such information from the memory or generating the image data, the output information obtainer 180 obtains the output information. This image data may include part of the map data 200. As in the first embodiment, the output information obtainer 180 may obtain sound data. A user presenter, such as a video display device, that serves as the output unit 400 presents those pieces of data so that they can be perceived by the user. For example, the video display device may present the screen illustrated in FIG. 3A or 3B to the user, and an autonomous-driving-requested section and a travel mode to be used in the vehicle 10 on the autonomous-driving-requested section may be indicated by respective rectangles and the colors or patterns in the respective rectangles. This output information may further indicate a route. In the example screen illustrated in FIG. 3A or 3B, the route is indicated by a dashed line.

Also, the output unit 400 may be the autonomous driving controller, and the output information may be information to be used in the autonomous driving controller. For example, the output information may include an instruction indicating start or stop of autonomous driving or a travel mode to be used. In accordance with the instruction indicated by the output information, the autonomous driving controller sends a control signal regarding at least one of acceleration, steering, and braking to the basic traveling system.

Figure 4B:
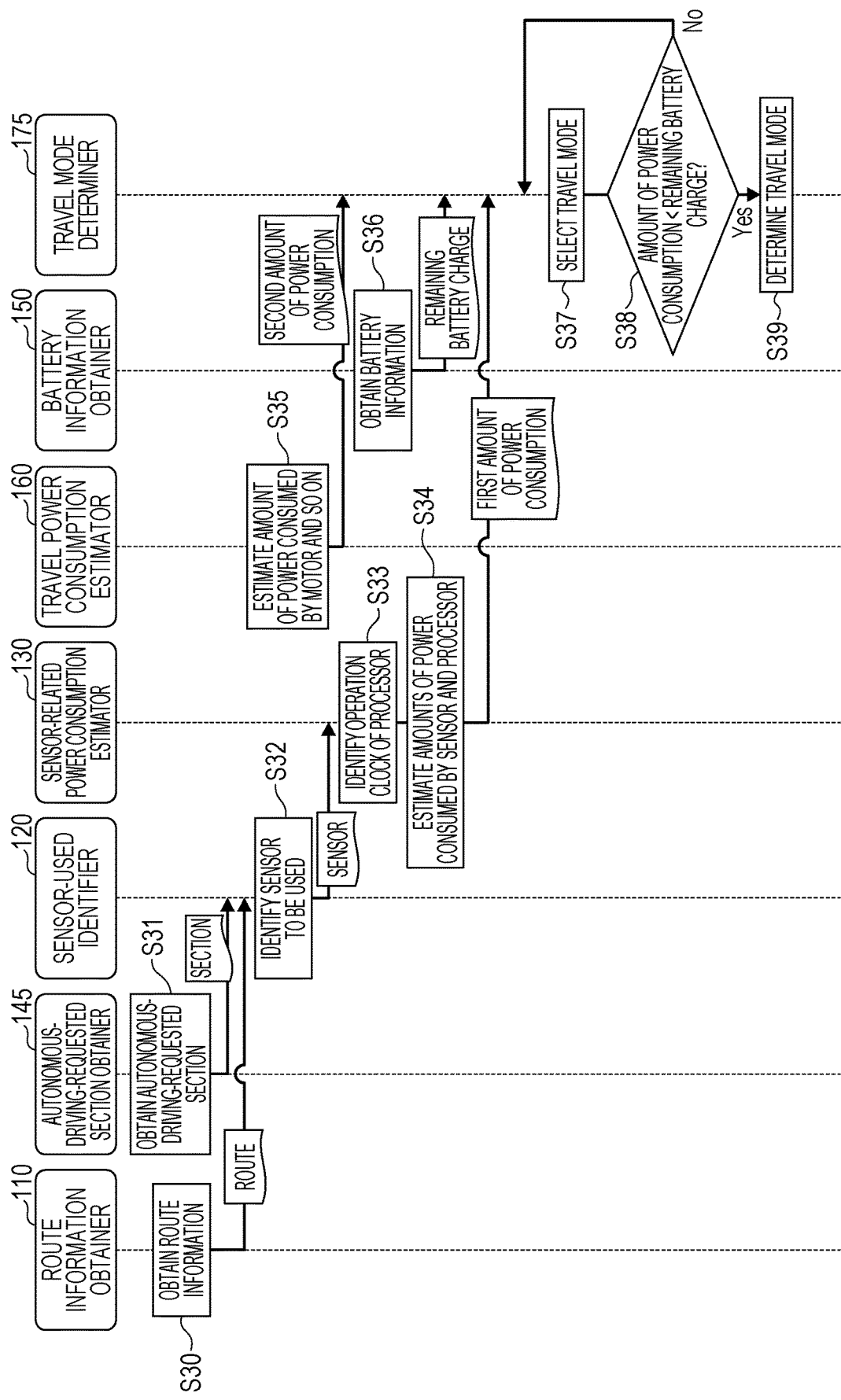
FIG. 4B is a sequence diagram illustrating processing performed by the information processing apparatus in the third embodiment.

Now, one example of processing performed by the information processing apparatus 2100 will be described with reference to FIG. 4B. FIG. 4B is a sequence diagram illustrating one example of processing performed by the information processing apparatus 2100.

First, the route information obtainer 110 obtains route information indicating a route to a destination indicated by destination information, the route information being based on the map data 200 (step S30).

The autonomous-driving-requested section obtainer 145 obtains autonomous-driving-requested section information indicating a section that is included in a route indicated by the route information and on which the vehicle 10 is requested to travel by autonomous driving (step S31).

The aforementioned destination and autonomous-driving-requested section are a destination and an autonomous-driving-requested section input by the user, for example, via a user interface of a car navigation system and are respectively supplied to the information processing apparatus 2100 as destination information and autonomous-driving-requested section information.

Next, the sensor-used identifier 120 identifies a vehicle-mounted sensor to be used on the autonomous-driving-requested section indicated by the autonomous-driving-requested section information (step S32). As described above, a sensor to be used for the autonomous driving may be identified for each travel mode that can be used on the autonomous-driving-requested section.

Next, the sensor-related power consumption estimator 130 estimates the amount of power that the sensor identified by the sensor-used identifier 120 consumes when the vehicle 10 performs autonomous driving on the autonomous-driving-requested section and the amount of power that the processor consumes to process data output from the sensor (step S34). In this example, the operation clock of the processor is identified (step S33), and the amount of power consumed by the processor is estimated based on the operation clock. As described above, power consumption information indicating the amount of power consumed by modules used in autonomous driving may be obtained for each travel mode. The amounts of power estimated by the sensor-related power consumption estimator 130 are illustrated as "first amount of power consumption" in FIG. 4B.

The travel power consumption estimator 160 estimates the amount of power that corresponds to the route information obtained by the route information obtainer 110 and the travel mode information obtained by the travel mode obtainer 140 and that a motor and so on in the basic traveling system consume on the route along which the vehicle 10 is to travel (step S35). The amount of power estimated by the travel power consumption estimator 160 is illustrated as "second amount of power consumption" in FIG. 4B.

The battery information obtainer 150 obtains battery information indicating the remaining charge in the battery 300 included in the vehicle 10 (step S36).

Next, based on the first amount of power consumption, the second amount of power consumption, and the battery information, the travel mode determiner 175 determines whether or not the vehicle 10 can travel autonomously along the entire autonomous-driving-requested section in the route indicated by the route information and can travel the entire route by using any of the travel modes. An example procedure of this determination will be described below.

First, the travel mode determiner 175 selects one of a plurality of travel modes (step S37). Next, based on the first amount of power consumption and the second amount of power consumption, the travel mode determiner 175 calculates the amount of power to be consumed by the vehicle 10 during traveling along the entire route when the vehicle 10 travels on the autonomous-driving-requested section by autonomous driving in the selected travel mode. Then, the calculated amount of power consumption is compared with a remaining battery charge indicated by the battery information (step S38). If the calculated amount of power consumption is larger than or equal to the remaining battery charge (No in step S38), it is determined that the vehicle 10 cannot travel the entire route after traveling the autonomous-driving-requested section autonomously in the selected travel mode, and the same procedure in another travel mode is repeated. If the calculated amount of power consumption is smaller than the remaining battery charge (Yes in step S38), it is determined that the vehicle 10 can travel the entire autonomous-driving-requested section autonomously in the selected travel mode and can travel the entire route, and the travel mode is determined as the travel mode to be used in the vehicle 10 on the autonomous-driving-requested section (step S39).

In step S37, the travel mode may be selected in an order according to a predetermined condition (e.g., in ascending or descending order of the levels of autonomous driving), and the user's input regarding the selection may be received.

As described above, with respect to the information regarding the amount of power consumed by the vehicle 10 and the information regarding the remaining charge in the battery 300, the information processing apparatus 2100 can perform processing for determining a travel mode to be used in the vehicle 10 on a section that is included in a route indicated by the route information and on which traveling by autonomous driving is requested. The information processing apparatus 2100 can also cause the user presenter to present the determined travel mode to the user. The information processing apparatus 2100 can cause the autonomous driving controller to send a control signal for controlling the basic control system in accordance with the determined travel mode.

Modification of Third Embodiment

Although, in the third embodiment, the information processing apparatus 2100 outputs the information indicating a travel mode to be used in the vehicle 10 on an autonomous-driving-requested section in a route indicated by the route information in response to an input of information indicating the autonomous-driving-requested section, the information processing apparatus 2100 may output information indicating at least the travel mode in accordance with a different request regarding the autonomous driving.

For example, the request regarding the autonomous driving may be a request regarding the distance of the section on which traveling by autonomous driving is requested or the ratio of the distance of the section to the distance of the entire route. Also, for example, the request regarding the autonomous driving may be a request regarding a time for which traveling by autonomous driving is requested or the ratio of the time to the time of traveling along the entire route.

In these cases, route information indicating a plurality of route candidates for one destination may be obtained so that the request is satisfied and be input to the information processing apparatus 2100. Then, the processing illustrated in FIG. 4B is executed on each candidate route, and the output information may indicate one or more routes with which the request is satisfied and the travel mode to be used in the vehicle 10 on an autonomous-driving-scheduled section included in each route.

Fourth Embodiment

FIG. 5A is a block diagram illustrating one example of the functional configuration of an information processing apparatus in a fourth embodiment.

An information processing apparatus 3100 in the fourth embodiment is also provided in a vehicle 10 that can travel by autonomous driving, similarly to the information processing apparatuses 100, 1100, and 2100. In the following description of the information processing apparatus 3100, differences from the above-described information processing apparatuses will be mainly described. Constituent elements that are the same as or similar to those in the above-described information processing apparatuses are denoted by the same reference numerals, and detailed descriptions thereof may be omitted, or descriptions thereof may be given briefly.

In response to an input of information indicating a plurality of candidates of a route along which the vehicle 10 is to travel to a destination, information indicating a section that is included in the route and on which traveling by autonomous driving is requested, and information indicating a travel mode requested to be used in the vehicle 10 that travels by autonomous driving, the information processing apparatus 3100 performs processing for outputting information indicating a route selected from the route candidates and determined as an optimum route.

The information processing apparatus 3100 includes a sensor-used identifier 120, a sensor-related power consumption estimator 130, a travel mode obtainer 140, an autonomous-driving-requested section obtainer 145, a battery information obtainer 150, a travel power consumption estimator 160, an output information obtainer 180, and an output controller 190, which are substantially the same as those in the information processing apparatuses in the above-described embodiments. The information processing apparatus 3100 further includes a destination information obtainer 105 and a route determiner 115. The information processing apparatus 3100 can also be implemented by an in-vehicle microcontroller, and those constituent elements are functional constituent elements thereof. In the information processing apparatus 3100, a processor executes a program stored in a memory to thereby realize the constituent elements.

The destination information obtainer 105 obtains destination information indicating a destination desired by a user. Although, in the present embodiment, the destination information is described as being obtained by the information processing apparatus 3100, the destination information may be based on the user's input to a car navigation system, as in the embodiments described above.

The route determiner 115 obtains route information indicating a plurality of route candidates based on destination information obtained by the destination information obtainer 105, the destination information being based on an input to the car navigation system. Although the number of route candidates obtained by the route determiner 115 may be one in practice, a case in which the number of route candidates is two or more is assumed below for convenience of description.

The route determiner 115 further obtains, from the sensor-related power consumption estimator 130 and the travel power consumption estimator 160, information indicating the amount of power consumed by modules (the sensors, the processor, and the basic traveling system) used in the autonomous driving and obtains, from the battery information obtainer 150, battery information indicating the remaining battery change. These pieces of information are used to estimate the amount of power consumed by the vehicle 10 during traveling along each route candidate, and an optimum route candidate is selected from the route candidates on the basis of the estimated amount of power and is determined as a route for the vehicle 10.

The output information obtainer 180 in the present embodiment obtains, as the output information, information resulting from processing performed by the route determiner 115. The output controller 190 outputs the output information to the output unit 400.

The "output information" as used in this case is, for example, information to be presented to the user and indicates at least a route determined by the route determiner 115. By obtaining image data indicating such information from the memory or generating the image data, the output information obtainer 180 obtains the output information. This image data may include part of the map data 200. As in the first and second embodiments, the output information obtainer 180 may obtain sound data. A user presenter, such as a video display device, that serves as the output unit 400 presents those pieces of data so that they can be perceived by the user. For example, the video display device presents the screen illustrated in FIG. 3A or 3B to the user, and the route determined by the route determiner 115 is indicated by a dashed line.

Also, the output unit 400 may be the autonomous driving controller, and the output information may be information used in the autonomous driving controller. For example, the output information includes an instruction indicating a route, start or stop of autonomous driving, or a travel mode to be used. In accordance with the instruction indicated by the output information, the autonomous driving controller sends, to the basic traveling system, a control signal regarding at least one of acceleration, steering, and braking.

Figure 5B:
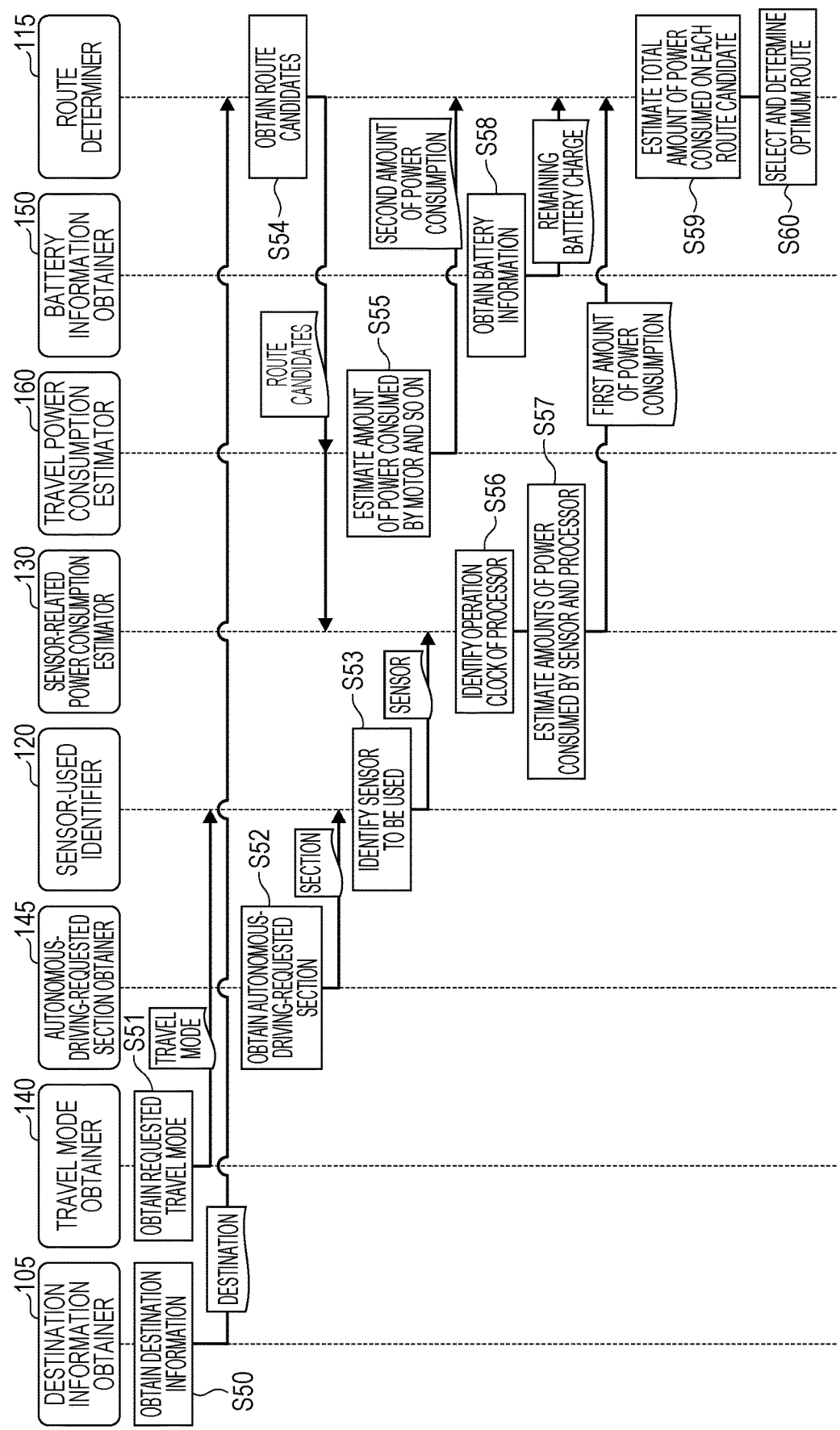
FIG. 5B is a sequence diagram illustrating processing performed by the information processing apparatus in the fourth embodiment.

Now, one example of processing performed by the information processing apparatus 3100 will be described with reference to FIG. 5B. FIG. 5B is a sequence diagram illustrating one example of processing performed by the information processing apparatus 3100.

First, the destination information obtainer 105 obtains destination information indicating a destination desired by a user (step S50).

The travel mode obtainer 140 obtains travel mode information indicating a travel mode regarding the autonomous driving of the vehicle 10 (step S51). In this example, the travel mode is a travel mode requested by the user, and in the processing described below, it is assumed that the travel mode is not changed.

The autonomous-driving-requested section obtainer 145 obtains autonomous-driving-requested section information indicating a section that is included in a route indicated by the route information and on which the vehicle 10 is requested to travel by autonomous driving (step S52). In this example, since route candidates have not been determined at this stage, the information indicated by the autonomous-driving-requested section information may indicate, for example, an approximate area. Alternatively, the autonomous-driving-requested section information may indicate a condition about a position (e.g., a first half or last half) on the route, a time segment, the distance or the time described in the modification of the third embodiment, the ratio of the distance or the time, or the like.

Next, the sensor-used identifier 120 identifies a vehicle-mounted sensor to be used in the travel mode indicated by the travel mode information (step S53). The sensor-used identifier 120 may identify a sensor to be used under the condition indicated by the autonomous-driving-requested section information. For example, when the time segment in which the sun has not risen is a condition, the sensor-used identifier 120 may identify a sensor to be used for object recognition in dark places.

Meanwhile, based on the destination information obtained by the route determiner 115 and the map data 200, the destination information obtainer 105 obtains route information indicating a plurality of route candidates (step S54).

Next, the travel power consumption estimator 160 estimates the amount of power that corresponds to the route information obtained by the route information obtainer 110 and that a motor and so on in the basic traveling system consume on each route candidate (step S55). The amount of power estimated by the travel power consumption estimator 160 is illustrated as "second amount of power consumption" in FIG. 5B.

The sensor-related power consumption estimator 130 also estimates the amount of power that the sensor identified by the sensor-used identifier 120 consumes when the vehicle 10 performs autonomous driving on an autonomous-driving-requested section in each route candidate indicated by the route information and the amount of power that the processor consumes to process data output by the sensor (step S56). In this example, the operation clock of the processor is identified (step S57), and the amount of power consumed by the processor is estimated based on the operation clock. The amount of power estimated by the sensor-related power consumption estimator 130 is illustrated as "first amount of power consumption" in FIG. 5B.

The battery information obtainer 150 obtains battery information indicating the remaining charge in the battery 300 included in the vehicle 10 (step S58).

Next, based on the first amount of power consumption, the second amount of power consumption, and the battery information, the route determiner 115 determines which of the route candidates indicated by the route information is optimum. An example procedure of this determination will be described below.

First, based on the first amount of power consumption and the second amount of power consumption, the route determiner 115 estimates the total amount of power used on each route candidate (step S59).

Upon estimating the total amounts of power to be used on all route candidates, the route determiner 115 selects an optimum route candidate therefrom and determines the selected route candidate as a route along which the vehicle 10 is travel to the destination indicated by the destination information.

The optimum route candidate may be selected according to a predetermined condition (e.g., in ascending or descending order of the levels of autonomous driving, the distance of the route, the distance of an autonomous-driving-scheduled section, a required time, or the amount of power consumption). Alternatively, the optimum route candidate may be selected based on a total score resulting from grading each candidate with respect to some conditions of those conditions. Different weighting may be given to each condition.

As described above, with respect to the information about the amount of power consumed by the vehicle 10 and the information about the remaining charge in the battery 300, the information processing apparatus 3100 can perform processing for determining a route along which the vehicle 10 is to travel, in accordance with the condition about a destination requested by the user, a travel mode, and a section on which the vehicle 10 is to travel by autonomous driving. The information processing apparatus 3100 can cause the user presenter to present the determined route to the user. The information processing apparatus 3100 can cause the autonomous driving controller to send a control signal for controlling the basic control system in accordance with the determined route.

The processing executed by the information processing apparatus 3100, the processing being described above with reference to FIG. 5B, is one example. For example, the condition about the travel mode or the section on which the vehicle 10 is to travel by autonomous driving is not essential to determining the route. What is presented to the user is not limited to one optimum route. For example, when there is a plurality of routes with which the total amount of power consumption calculated in step S59 is smaller than the remaining battery charge indicated by the battery information, these routes may be presented as candidates to be selected by the user. Also, one of or both the travel mode and the section that is included in the route and on which the vehicle 10 is to travel by autonomous driving may be presented to the user in conjunction with the route to be presented. These pieces of information are useful as information for selecting a section on which the user drives by himself or herself and a section on which he or she does not drive, selecting the level of assistance by the autonomous driving, or selecting a route.

Other Embodiments

Although the information processing apparatuses according to one or more aspects have been described above based on the embodiments, the present disclosure is not limited to the embodiments. Modes obtained by applying various modifications conceived by those skilled in the art to the embodiments or modes constituted by combining the constituent elements in different embodiments are also encompassed by the scope of one or more aspects, as long as such modes do not depart from the spirit of the present disclosure.

For example, although the output unit 400 that may be an autonomous driving controller or the user presenter, such as a video display device, has been described above in each embodiment or the modification thereof, the output unit 400 may include a combination of an autonomous driving controller and a user presenter. Accordingly, for example, the output controller 190 causes the user presenter included in the output unit 400 to present, to the user, the remaining battery charge in the battery, the amount of power consumption, a route along which the vehicle 10 is to travel or candidates of the route, an autonomous-driving-scheduled section or candidates thereof, a travel mode to be used or candidates thereof, any combination thereof, or the like. When the user inputs user input information including a result of selection from those candidates via a user interface in the vehicle 10, the output information obtainer 180 obtains output information for causing the autonomous driving controller to control the vehicle 10, based on the user input information (this output information is referred to as "second output information" for the sake of convenience, in order to distinguish this output information from the above-described output information presented to the user). For example, in accordance with the result of the selection by the user, the second output information includes a route along which the vehicle 10 is to travel and with which the amount of power consumption indicated by the power consumption information is smaller than the remaining battery charge indicated by the battery information, the travel mode regarding the autonomous driving of the vehicle 10, and the autonomous-driving-scheduled section of the vehicle 10 which is included in the route. The output controller 190 may cause the autonomous driving controller included in the output unit 400 to control the autonomous driving of the vehicle 10 in accordance with the second output information.

Figure 6:
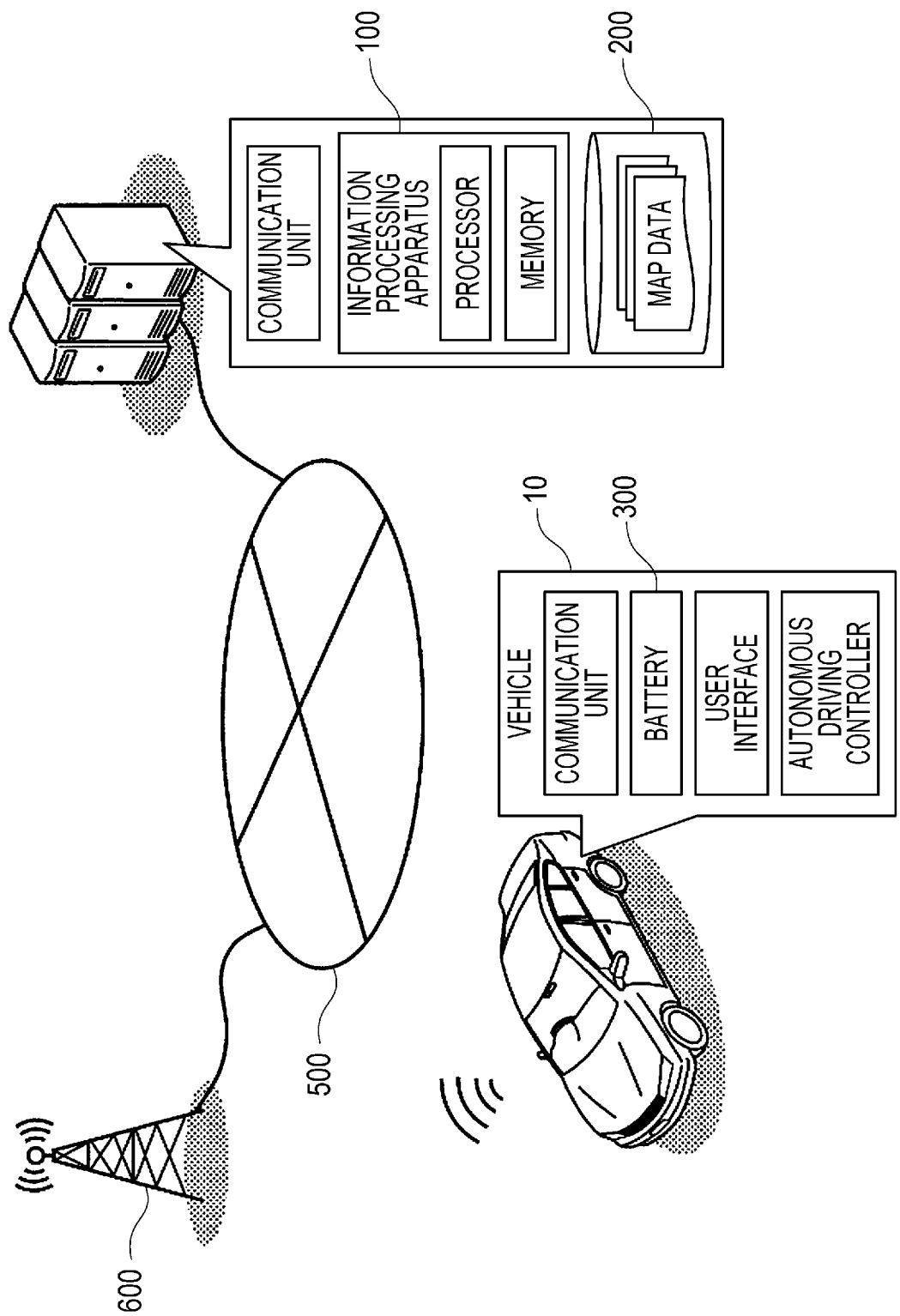
FIG. 6 is a conceptual diagram illustrating an aspect in which an information processing apparatus in the first embodiment is implemented.

For example, rather than being provided in the vehicle 10, the information processing apparatus may be realized by one or more computers that are provided outside the vehicle 10 and that are communicably connected to the vehicle 10. FIG. 6 is a conceptual diagram illustrating an aspect in which the information processing apparatus 100 in the first embodiment is implemented by one or more computers. Referring to FIG. 6, the vehicle 10 and the information processing apparatus 100 are communicably connected to each other through a communications network 500, such as the Internet, including a wireless communication section using a relay station 600.

The information processing apparatus 100 is realized by a memory or memories and a processor or processors included in one or more server computers on a network, and the constituent elements of the information processing apparatus 100 are functional constituent elements. Each processor executes a program stored in the corresponding memory to thereby realize the functional constituent elements. The one or more server computers include the map data 200 that can be accessed by the processor.

Although the vehicle 10 has been described above as being an electric automobile in each embodiment, the information processing apparatus 100 may also be applied to a vehicle other than an electric automobile. The vehicle 10 may be any type of vehicle including an engine as a power source, as long as it can perform autonomous driving using power accumulated in a battery in a vehicle or power generated by a vehicle without power being continuously supplied externally.

Also, in the vehicle 10, the user inputs destination information by using a user interface, and a system (not illustrated) that cooperates with the information processing apparatus 100 obtains battery information of the battery 300. The information processing apparatus 100 receives and obtains, via a communication unit in the information processing apparatus 100, the destination information and the battery information transmitted from a communication unit in the vehicle 10.

Information regarding sensors and processors included in each vehicle 10 may be pre-obtained from the vehicle 10, be registered, and be updated as appropriate. In the information processing apparatus 100 in the server computer, the sensor-used identifier 120 can identify a sensor to be used for autonomous traveling, by referring to the registered information, and the sensor-related power consumption estimator 130 can also estimate the amounts of power consumed by the sensor(s) and the processor(s), by referring to the registered information.

The output unit 400 that receives the second output information from the output controller 190 is a communication unit, and output of the second output information which is performed by the communication unit is transmission of the output information to the vehicle 10. The second output information is information that is to be presented to the user and that is to be used by the autonomous driving controller included in the vehicle 10.

Although an aspect in which the information processing apparatus 100 is realized by one or more computers that are provided outside the vehicle 10 has been described above by way of example, each of the information processing apparatuses 1100, 2100, and 3100 may similarly be realized by one or more computers that are provided outside the vehicle 10.

In addition, since the information processed by the information processing apparatus in each embodiment is exchanged with a car navigation system or a portable terminal, such as a smartphone, as described above, the information processing apparatus may cooperate with or may be integrated with a car navigation system or a portable terminal to constitute a more advanced system. The user interface may also be used as a user interface of the vehicle 10.

One aspect of the present disclosure may be realized as an information processing method including the steps included in the processes of the information processing in each embodiment described above.

That is, this information processing method is a method for obtaining power consumption information indicating an amount of power consumed by a module used in autonomous driving of a vehicle and according to unit-power consumption information of the module and destination information indicating a place to which the vehicle is to travel, obtaining output information based on the power consumption information, and outputting the output information.

In each embodiment described above, each constituent element may be implemented by dedicated hardware.

The present disclosure can be applied to information processing for autonomous driving of an electric automobile that can perform autonomous driving.

What is claimed is:

1. An information processing apparatus comprising:
a processor; and
a memory storing thereon a computer program, which when executed by the processor, causes the processor to perform operations including:
determining power consumption information indicating an amount of power consumption of a module used in autonomous driving of a vehicle using (i) unit-power consumption information of the module and (ii) destination information indicating a place to which the vehicle is to travel;
obtaining battery information indicating a remaining charge in a battery included in the vehicle;
obtaining route information indicating a route along which the vehicle is to travel using the destination information,
wherein the power consumption information is determined further using the route information; and
outputting at least one of (A) an autonomous-driving travel mode in which the vehicle performs autonomous driving, and (B) a section that is included in the route and on which the vehicle is to travel by autonomous driving,
wherein each of (A) the autonomous-driving travel mode and (B) the section is determined using (i) the power consumption information indicating the amount of power consumption of the module used in autonomous driving of the vehicle and (ii) the battery information.

2. The information processing apparatus according to claim 1, wherein the vehicle travels by using, as a power source, a motor that operates on power from the battery.

3. The information processing apparatus according to claim 1,
wherein the output information includes at least one of (i) the travel mode in which the amount of power consumption indicated by the power consumption information is smaller than the remaining charge indicated by the battery information and (ii) the section with which the amount of power consumption indicated by the power consumption information is smaller than the remaining charge indicated by the battery information.

4. The information processing apparatus according to claim 1,
wherein the outputting of the output information includes outputting the output information to an autonomous driving controller in the vehicle to cause the autonomous driving controller to control the autonomous driving of the vehicle.

5. The information processing apparatus according to claim 4, wherein the outputting of the output information outputs the output information to a presenting unit that presents the output information to a user, wherein the determining of the output information determines second output information using user input information that the user inputs in response to the output information presented by the presenting unit, and wherein the outputting of the output information outputs the second output information to the autonomous driving controller to cause the autonomous driving controller to control the autonomous driving of the vehicle.

6. The information processing apparatus according to claim 5, wherein the user input information includes a result of a user's selection of details of the autonomous driving from the presented output information, and wherein, in accordance with the result, the second output information includes (i) the route along which the vehicle is to travel with which the amount of power consumption indicated by the power consumption information is smaller than the remaining charge indicated by the battery information, (ii) the travel mode regarding the autonomous driving of the vehicle with which the amount of power consumption indicated by the power consumption information is smaller than the remaining charge indicated by the battery information, and (iii) the section that is included in the route and on which the vehicle is to travel by the autonomous driving with which the amount of power consumption indicated by the power consumption information is smaller than the remaining charge indicated by the battery information.

7. The information processing apparatus according to claim 1, wherein the module used in the autonomous driving comprises at least one of a sensor and a processor.

8. The information processing apparatus according to claim 7, wherein the module used in the autonomous driving further comprises a basic traveling system in the vehicle.

9. An information processing apparatus comprising:
a processor; and
a memory storing thereon a computer program, which when executed by the processor, causes the processor to perform operations including:
determining power consumption information indicating an amount of power consumption of a module used in autonomous driving of a vehicle using (i) unit-power consumption information of the module and (ii) destination information indicating a place to which the vehicle is to travel;
obtaining battery information indicating a remaining charge in a battery included in the vehicle;
obtaining a designated autonomous-driving travel mode in which the vehicle performs autonomous driving; and
obtaining candidate route information indicating a candidate route that is a candidate on which the vehicle is to travel using the destination information,
wherein the power consumption information is determined using the candidate route information, and
outputting at least one of (A) a section on which the vehicle is to travel by the autonomous driving from the candidate route and (B) the candidate route including at least a part on which the vehicle is to travel in the designated autonomous-driving travel mode, wherein each of (A) the section and (B) the candidate route is determined using the battery information, the designated autonomous-driving travel mode, and the power consumption information indicating the amount of power consumption of the module used in autonomous driving of the vehicle.

10. The information processing apparatus according to claim 9, wherein the output information includes at least one of (i) the section with which the amount of power consumption indicated by the power consumption information is smaller than the remaining charge indicated by the battery information when the autonomous driving is performed in the travel mode and (ii) the candidate route with which the amount of power consumption indicated by the power consumption information is smaller than the remaining charge indicated by the battery information when the autonomous driving is performed in the autonomous-driving travel mode.

11. An information processing apparatus comprising:
a processor; and
a memory storing thereon a computer program, which when executed by the processor, causes the processor to perform operations including:
determining power consumption information indicating an amount of power consumption of a module used in autonomous driving of a vehicle using (i) unit-power consumption information of the module and (ii) destination information indicating a place to which the vehicle is to travel;
obtaining battery information indicating a remaining charge in a battery included in the vehicle;
obtaining autonomous-driving-requested section information indicating at least a partial section of a route on which the vehicle is requested to travel by autonomous driving; and
obtaining candidate route information indicating a candidate route that is a candidate on which the vehicle is to travel using the destination information,
wherein the power consumption information is determined using the candidate route information, and
outputting at least one of (A) an autonomous-driving travel mode in which the vehicle performs autonomous driving on the section and (B) a candidate route including the section, wherein each of (A) the autonomous-driving travel mode and the (B) the candidate route including the section is determined using the battery information, the autonomous-driving-requested section information, and the power consumption information indicating the amount of power consumption of the module used in autonomous driving of the vehicle.

12. The information processing apparatus according to claim 11, wherein the output information includes at least one of (i) the travel mode in which the amount of power consumption indicated by the power consumption information on the section is smaller than the remaining charge indicated by the battery information when the autonomous driving is performed and (ii) the candidate route including the section with which the amount of power consumption indicated by the power consumption information on the section is smaller than the remaining charge indicated by the battery information when the autonomous driving is performed.

13. An information processing method, comprising:
determining power consumption information indicating an amount of power consumed by a module used in autonomous driving of a vehicle using (i) unit-power consumption information of the module and (ii) destination information indicating a place to which the vehicle is to travel;

obtaining battery information indicating a remaining charge in a battery included in the vehicle; and obtaining route information indicating a route along which the vehicle is to travel using the destination information, wherein the power consumption information is determined further based on the route information, and outputting at least one of (A) an autonomous-driving travel mode in which the vehicle performs autonomous driving and (B) a section that is included in the route and on which the vehicle is to travel by the autonomous driving, wherein each of (A) the autonomous-driving travel mode and (B) the section is determined using (i) the power consumption information indicating the amount of power consumption of the module used in autonomous driving of the vehicle and (ii) the battery information.

14. An information processing method, comprising:

determining power consumption information indicating an amount of power consumed by a module used in autonomous driving of a vehicle using (i) unit-power consumption information of the module and (ii) destination information indicating a place to which the vehicle is to travel;

obtaining battery information indicating a remaining charge in a battery included in the vehicle;

obtaining a designated autonomous-driving travel mode in which the vehicle performs autonomous driving; and obtaining candidate route information indicating a candidate route that is a candidate on which the vehicle is to travel using the destination information, wherein the power consumption information is determined further using the candidate route information, and outputting at least one of (A) a section on which the vehicle is to travel by the autonomous driving from the candidate route and (B) the candidate route including at least a part on which the vehicle is to travel in the designated autonomous-driving travel mode, wherein each of (A) the section and (B) the candidate route is determined using the battery information, the designated autonomous-driving travel mode, and the power consumption information indicating the amount of power consumption of the module used in autonomous driving of the vehicle.

15. An information processing method, comprising:

determining power consumption information indicating an amount of power consumed by a module used in autonomous driving of a vehicle using (i) unit-power consumption information of the module and (ii) destination information indicating a place to which the vehicle is to travel;

obtaining battery information indicating a remaining charge in a battery included in the vehicle;

obtaining autonomous-driving-requested section information indicating at least a partial section of a route on which the vehicle is requested to travel by autonomous driving; and obtaining candidate route information indicating a candidate route that is a candidate on which the vehicle is to travel using the destination information, wherein the power consumption information is determined further using the candidate route information, and outputting at least one of (A) an autonomous-driving travel mode in which the vehicle performs autonomous driving on the section and (B) a candidate route including the section, wherein each of (A) the autonomous-driving travel mode and the (B) the candidate route including the section is determined using the battery information, the autonomous-driving-requested section information, and the power consumption information indicating the amount of power consumption of the module used in autonomous driving of the vehicle.

* * * * *